United States Patent
Shucker et al.

(10) Patent No.: US 12,323,691 B2
(45) Date of Patent: Jun. 3, 2025

(54) CHARACTERIZING AN UNDEFINED CAMERA MODEL OF A COMPUTING DEVICE CAMERA

(71) Applicant: Google LLC, Mountain View, CA (US)

(72) Inventors: Brian Daniel Shucker, Superior, CO (US); Jianxiang Fan, Boulder, CO (US); Yan Mayster, Aurora, CO (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/029,807

(22) PCT Filed: Jun. 9, 2022

(86) PCT No.: PCT/US2022/032794
§ 371 (c)(1),
(2) Date: Mar. 31, 2023

(87) PCT Pub. No.: WO2023/239363
PCT Pub. Date: Dec. 14, 2023

(65) Prior Publication Data
US 2024/0364996 A1    Oct. 31, 2024

(51) Int. Cl.
*H04N 23/61*    (2023.01)
*G06V 10/75*    (2022.01)
(Continued)

(52) U.S. Cl.
CPC ........... *H04N 23/617* (2023.01); *G06V 10/75* (2022.01); *H04N 23/73* (2023.01)

(58) Field of Classification Search
USPC ....................................................... 348/143
See application file for complete search history.

(56) References Cited

U.S. PATENT DOCUMENTS 11,151,222 B1* 10/2021 Coffey .................... G01W 1/12
11,399,531 B1*  8/2022 Sibley .................... A01G 7/06
(Continued)

FOREIGN PATENT DOCUMENTS

WO    WO2006/113600    10/2006

OTHER PUBLICATIONS

Klaus et al., "Camera Calibration from a Single Night Sky Image", Proceedings of the 2004 IEEE Computer Society Conference on Computer Vision and Pattern Recognition, Jun. 27, 2004, Proceedings of IEEE Computer Society Conference on Computer Vision and Pattern Recognition, vol. 1, pp. 151-157, XP010708996.
(Continued)

*Primary Examiner* — Nigar Chowdhury
(74) *Attorney, Agent, or Firm* — DORITY & MANNING P.A.

(57) ABSTRACT

According to one example embodiment, a computing device can include a camera, one or more processors, and one or more computer-readable media that store instructions that, when executed by the one or more processors, cause the computing device to perform operations. The operations can include defining a camera model of the camera based at least in part on location data associated respectively with an object in an image of a night sky and a cataloged star that corresponds to the object. The operations can further include performing an iterative process to iteratively update the camera model. For at least one iteration of the iterative process the operations can further include updating the camera model based at least in part on additional location data associated respectively with an additional object in an additional image of the night sky and an additional cataloged star that corresponds to the additional object.

18 Claims, 4 Drawing Sheets

(51) Int. Cl.
*H04N 23/617* (2023.01)
*H04N 23/73* (2023.01)

(56) References Cited

U.S. PATENT DOCUMENTS

| | | | | |
|---|---|---|---|---|
| 11,562,153 | B1* | 1/2023 | Etwaru | G06F 40/58 |
| 2006/0235614 | A1* | 10/2006 | Jacox | G09B 27/00 |
| | | | | 701/513 |
| 2011/0249092 | A1* | 10/2011 | Jacobs | H04N 13/398 |
| | | | | 348/43 |
| 2016/0328827 | A1* | 11/2016 | Ilic | G06T 3/4038 |
| 2016/0330374 | A1* | 11/2016 | Ilic | H04N 23/64 |
| 2017/0163918 | A1* | 6/2017 | Chen | H04N 23/632 |
| 2018/0300516 | A1* | 10/2018 | Beckmann | G06K 7/10861 |
| 2018/0330521 | A1* | 11/2018 | Samples | F21V 23/0471 |
| 2018/0341248 | A1* | 11/2018 | Mehr | G06N 20/10 |
| 2018/0376067 | A1* | 12/2018 | Martineau | H04N 23/60 |
| 2019/0303725 | A1* | 10/2019 | Gurvich | G06V 10/82 |
| 2021/0344827 | A1* | 11/2021 | Van Hoey | H04N 23/10 |
| 2022/0388070 | A1* | 12/2022 | Luan | B33Y 50/00 |

OTHER PUBLICATIONS

International Search Report for Application No. PCT/US2022/032794, mailed on Feb. 2, 2023, 6 pages.
International Preliminary Report on Patentability for Application No. PCT/US2022/032794, mailed Dec. 19, 2024, 9 pages.

* cited by examiner ental Application

CHARACTERIZING AN UNDEFINED CAMERA MODEL OF A COMPUTING DEVICE CAMERA

PRIORITY CLAIM

This application is based upon and claims the right of priority under 35 U.S.C. § 371 to International Application No. PCT/US2022/032794 filed on Jun. 9, 2022, which is incorporated by reference herein in its entirety.

FIELD

The present disclosure relates generally to characterizing a camera model of a camera. More particularly, the present disclosure relates to characterizing an undefined camera model of a computing device camera.

BACKGROUND

When geolocating objects that are detected in ground-level imagery that is captured using a computing device that includes and/or is coupled to a camera, it is important to have an accurate camera model for the camera and/or lens thereof. The camera model describes the projection of pixel positions in an image to rays in the real, physical world. Without such a camera model, objects detected (e.g., captured) in an image cannot be accurately projected into the real world, which is necessary for certain applications including localizing the camera, generating map data from imagery, powering augmented reality experiences, and/or other uses.

A problem with camera models associated with cameras and/or camera lenses coupled to different types of computing devices is that accurate camera models are known and available for use with some types of devices but are undefined and not available for many device types. Additionally, as the camera model is affected by properties of the focal plane and the lens (e.g., pixel size, radial distortion), there can be variations for a given camera model across individual devices of a certain type.

A problem with defining a camera model for a certain type of device and/or for an individual device of a certain type is that it can be inconvenient and expensive, as it can involve taking the device to a lab to perform a camera model characterization process and/or to take measurements associated with the camera and/or camera lens coupled to the device to calculate the camera model. For example, such a camera model characterization process can include using a camera of a computing device to capture a photo of a reference image having predefined reference points corresponding to predefined locations on the captured image. Since the location of all reference points in the reference image are known and the location on the captured image where the reference points landed in the captured image are known, the camera model can be calculated to determine intrinsic camera parameters including, for instance, the field of view, lens distortion, radial distortion terms, pixel scale, optical center offset, and/or other parameters.

SUMMARY

Aspects and advantages of embodiments of the present disclosure will be set forth in part in the following description, or can be learned from the description, or can be learned through practice of the embodiments.

According to one example embodiment, a computing device can include a camera, one or more processors, and one or more computer-readable media that store instructions that, when executed by the one or more processors, cause the computing device to perform operations. The operations can include defining a camera model of the camera based at least in part on location data associated respectively with an object in an image of a night sky and a cataloged star that corresponds to the object. The operations can further include performing an iterative process to iteratively update the camera model. For at least one iteration of the iterative process the operations can further include updating the camera model based at least in part on additional location data associated respectively with an additional object in an additional image of the night sky and an additional cataloged star that corresponds to the additional object.

According to another example embodiment, a computer-implemented method of characterizing an undefined camera model of a computing device camera can include defining, by a computing device comprising a camera, a camera model of the camera based at least in part on location data associated respectively with an object in an image of a night sky and a cataloged star that corresponds to the object. The computer-implemented method can further include performing, by the computing device, an iterative process to iteratively update the camera model. For at least one iteration of the iterative process the computer-implemented method can further include updating, by the computing device, the camera model based at least in part on additional location data associated respectively with an additional object in an additional image of the night sky and an additional cataloged star that corresponds to the additional object.

According to another example embodiment, one or more computer-readable media that can store instructions that, when executed by one or more processors of a computing device, can cause the computing device to perform operations. The computing device can be operatively coupled to a camera. The operations can include defining a camera model of the camera based at least in part on location data associated respectively with an object in an image of a night sky and a cataloged star that corresponds to the object. The operations can further include performing an iterative process to iteratively update the camera model. For at least one iteration of the iterative process the operations can further include updating the camera model based at least in part on additional location data associated respectively with an additional object in an additional image of the night sky and an additional cataloged star that corresponds to the additional object.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
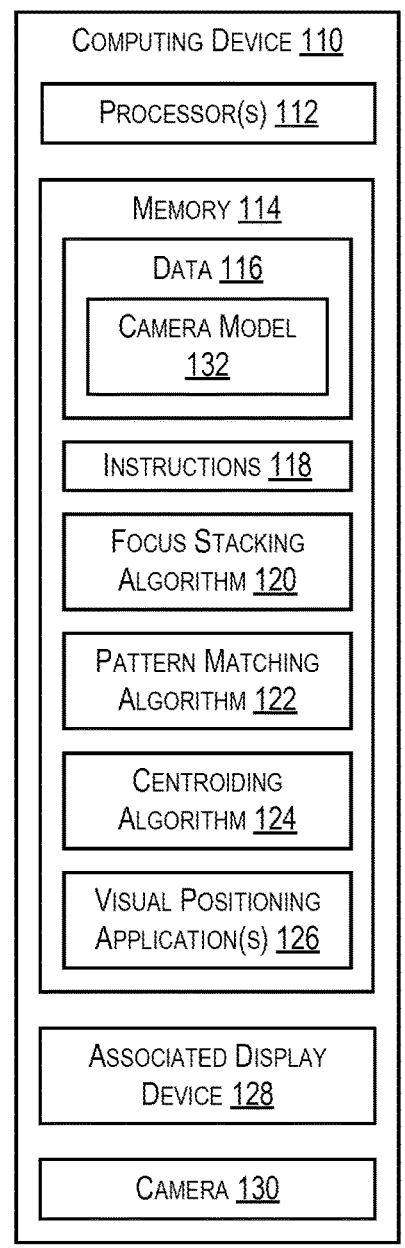
FIG. 1 illustrates a block diagram of an example, non-limiting device according to one or more example embodiments of the present disclosure.

Repeated use of reference characters and/or numerals in the present specification and/or figures is intended to represent the same or analogous features, elements, or operations of the present disclosure. Repeated description of reference characters and/or numerals that are repeated in the present specification is omitted for brevity.

DETAILED DESCRIPTION

Overview

As referred to herein, the terms "includes" and "including" are intended to be inclusive in a manner similar to the term "comprising." As referenced herein, the terms "or" and "and/or" are generally intended to be inclusive, that is (i.e.), "A or B" or "A and/or B" are each intended to mean "A or B or both." As referred to herein, the terms "first," "second," "third," and so on, can be used interchangeably to distinguish one component or entity from another and are not intended to signify location, functionality, or importance of the individual components or entities. As referenced herein, the terms "couple," "couples," "coupled," and/or "coupling" refer to chemical coupling (e.g., chemical bonding), communicative coupling, electrical and/or electromagnetic coupling (e.g., capacitive coupling, inductive coupling, direct and/or connected coupling, etc.), mechanical coupling, operative coupling, optical coupling, and/or physical coupling.

Example aspects of the present disclosure are directed to characterizing an undefined camera model of a computing device camera. More specifically, example embodiments described herein are directed to defining one or more intrinsic camera parameters of a previously uncharacterized or relatively poorly characterized camera and/or camera lens that can be included in and/or coupled (e.g., operatively) to a computing device such as, for example, a client computing device, a computer, a laptop, a cellular phone, a smartphone, a tablet, a wearable computing device, an action camera, a dashboard camera, an omnidirectional camera, and/or another computing device.

According to one or more example embodiments of the present disclosure, a computing device such as, for instance, computing device 110 described below with reference to the example embodiments depicted in FIGS. 1 and 2, can facilitate characterizing an undefined camera model of a camera and/or a camera lens that can be included in and/or coupled (e.g., operatively) to the computing device. For example, in these one or more example embodiments, the computing device can characterize such an undefined camera model by defining one or more intrinsic camera parameters that can include, but are not limited to, a field of view, a lens distortion, a map of the lens distortion, a radial distortion term, a pixel scale, an optical center offset, and/or another intrinsic camera parameter. In example embodiments described herein, such intrinsic camera parameter(s) characterize the optical, geometric, and/or digital characteristics of a camera and effectively link pixel coordinates of an object or a point in an image with corresponding coordinates in a camera reference frame of the camera.

As described in detail below, to characterize the undefined camera model of a camera and/or camera lens that can be included in and/or coupled (e.g., operatively) to the above-described computing device according to example embodiments described herein, the computing device can leverage imagery of stars in a night sky (e.g., a night sky as viewed from a certain vantage point) and a star database (e.g., a publicly accessible star catalog) that includes the known locations of the stars captured in the imagery. For instance, in one or more example embodiments described in detail below, to characterize the undefined camera model of such a camera and/or camera lens, the computing device can: implement (e.g., execute, run) a focus stacking algorithm to capture a plurality of images of stars in a night sky using the camera; and implement (e.g., execute, run) a pattern matching algorithm to identify (e.g., attempt to identify) certain objects in the images that correspond to certain stars in the night sky. In this or another embodiment, the computing device can further leverage the known locations of such corresponding stars to determine the pixel location and true world ray for each corresponding star.

As referenced hereinafter, an "object" captured in an image refers to an object in the image that represents a certain star in a night sky. Further, as referenced herein, a "matched" star refers to a certain star in a night sky that is included in a star catalog and is identified as corresponding to an object in an image of the night sky.

In at least one embodiment of the present disclosure, to characterize an undefined camera model of a camera and/or camera lens that can be included in and/or coupled to the computing device, the computing device can perform operations that can include, but are not limited to: determining an initial exposure time of the camera that allows the computing device to identify, in an image of a night sky that can be captured by the camera using the initial exposure time, one or more objects that correspond respectively to one or more cataloged stars (e.g., to one or more stars in a star catalog); defining an initial camera model of the camera based at least in part on (e.g., using) location data associated respectively with the one or more objects (e.g., pixel location data associated with each of the object(s) in the image) and the one or more cataloged stars (e.g., location data of each of the cataloged star(s), which can be obtained from a star catalog); and/or performing an iterative camera model update process to iteratively update the initial camera model. In this or another embodiment, at one or more iterations (e.g., at each iteration) of the iterative camera model update process, the computing device can perform operations that can include, but are not limited to: increasing the exposure time to an increased exposure time; operating the camera to capture an additional image of the night sky using the increased exposure time; identifying (e.g., attempting to identify), in the additional image, one or more additional objects that correspond respectively to one or more additional cataloged stars; and/or updating the initial camera model based at least in part on (e.g., using) additional location data corresponding respectively to the one or more additional objects (e.g., pixel location data associated with each of the additional object(s) identified in the additional image) and the one or more additional cataloged stars (e.g., location data of each of the additional cataloged star(s), which can be obtained from a star catalog).

In one or more embodiments described herein, to determine the initial exposure time of the camera that allows the computing device to identify, in an image of a night sky that can be captured by the camera using the initial exposure time, one or more objects that correspond respectively to one or more cataloged stars, the computing device can perform an iterative initial exposure time process (e.g., a trial and error process) that can include: operating the camera to capture multiple images of the night sky over multiple iterations using a different exposure time at each iteration such that each image is captured using a different exposure time; and/or implementing (e.g., executing, running) a pattern matching algorithm (e.g., a star tracker algorithm, triangle matching algorithm) at each iteration to attempt to identify, in each image captured at each iteration, one or more objects that correspond respectively to one or more cataloged stars. In these one or more embodiments, a certain exposure time used to capture a certain image in which the computing device is able to identify (e.g., via the pattern matching algorithm) one or more objects that correspond respectively to one or more cataloged stars can thereby constitute the initial exposure time that allows the computing device to make such an identification.

In some embodiments of the present disclosure, by implementing a pattern matching algorithm (e.g., a star tracker algorithm, triangle matching algorithm) to identify (e.g., attempt to identify) one or more objects in an image of a night sky that correspond respectively to one or more cataloged stars, the computing device can thereby perform a pattern matching process that involves matching triangles observed between objects in the image to known triangles between stars in a star catalog. For instance, in these or other embodiments, the computing device (e.g., via the pattern matching algorithm) can identify (e.g., attempt to identify) a set of three stars in a star catalog and further identify (e.g., attempt to identify) a triangle that is defined by such a set of three stars (e.g., where the three stars are the three vertices of the triangle). In these or other embodiments, the computing device (e.g., via the pattern matching algorithm) can compute the ratio of the sides of such a triangle. In these or other embodiments, the computing device (e.g., via the pattern matching algorithm) can then analyze the image of the night sky to identify (e.g., attempt to identify) a set of three objects in the image that form a triangle having the same ratio of the sides as that of the triangle identified in the star catalog. In these or other embodiments, the computing device (e.g., via the pattern matching algorithm) can thereby identify three candidate matches of objects in the image that possibly correspond to stars in the star catalog. In these or other embodiments, the computing device (e.g., via the pattern matching algorithm) can then look for a set of consistent candidate matches where a certain star is identified as being a member of many triangles that are all consistent with each other in the star catalog and the image. In these or other embodiments, such a certain star can constitute a matched cataloged star that corresponds to a certain object in the image.

In at least one embodiment of the present disclosure, the above-described initial exposure time of the camera can constitute an exposure time that allows the camera to capture an image of one or more stars in a night sky that have a certain level of brightness. For example, in this or another embodiment, the initial exposure time can constitute an exposure time that is relatively short in duration (e.g., relative to other exposure times that can be used with the camera) to allow the camera to capture an image of one or more of the brightest stars in a night sky (e.g., the brightest star(s) relative to other stars in the night sky).

In this manner, the computing device according to at least one embodiment described herein can limit the computational costs associated with implementing the pattern matching algorithm (e.g., a star tracker algorithm, triangle matching algorithm) as described above to identify (e.g., attempt to identify) one or more objects in an image of a night sky that correspond respectively to one or more cataloged stars. For instance, by capturing an image of a certain quantity (e.g., 5, 10, 20) of the relatively brightest star(s) in a night sky, the computing device according to at least one embodiment described herein can thereby limit the number of candidate matches of objects in the image that possibly correspond to stars in the star catalog, which can limit the processing workload and/or computational costs of a processor that can be included in and/or coupled (e.g., operatively) to the computing device.

In some embodiments of the present disclosure, the computing device can implement (e.g., execute, run) a focus stacking algorithm when operating the camera to capture one or more images of a night sky in accordance with example embodiments described herein. In these embodiments, the computing device can implement the focus stacking algorithm such that at least one object in each image of the night sky has a defined focus (e.g., a focus that is sharper (e.g., better, more focused, less blurry) relative to other objects captured in the same image).

In one example embodiment, the computing device can implement (e.g., execute, run) such a focus stacking algorithm when determining the above-described initial exposure time of the camera that allows the computing device to identify one or more objects in an image that correspond respectively to one or more cataloged stars. For instance, in this or another example embodiment, the computing device can implement such a focus stacking algorithm when operating the camera to capture each of the multiple images of the night sky over multiple iterations using a different exposure time at each iteration as described above. In this or another example embodiment, the computing device can implement the focus stacking algorithm such that at least one of the one or more objects captured in each of the multiple images has a defined focus (e.g., a focus that is sharper (e.g., better, more focused, less blurry) relative to other objects captured in the same image).

In this manner, the computing device according to at least one embodiment described herein can limit the computational costs associated with implementing the pattern matching algorithm (e.g., a star tracker algorithm, triangle matching algorithm) as described above to identify (e.g., attempt to identify) one or more objects in an image of a night sky that correspond respectively to one or more cataloged stars. For instance, by capturing an image of a night sky such that one or more objects in the image have a relatively sharper focus compared to other objects in the same image, the computing device according to at least one embodiment described herein can thereby provide more accurate input data to the pattern matching algorithm compared to input data it could otherwise provide without implementing the focus stacking algorithm. For example, in this or another embodiment, the computing device can provide the pattern matching algorithm with an image of one or more objects that each more closely resemble a point source rather than a blurry dot or blob. In this or another embodiment, by providing the pattern matching algorithm with such an image of one or more objects that each more closely resemble a point source rather than a blurry dot or blob, the computing device can thereby facilitate more efficient execution of such an algorithm and limit the processing workload of a processor that executes the algorithm (e.g., a processor that can be included in and/or coupled (e.g., operatively) to the computing device).

In at least one embodiment of the present disclosure, the above-described initial exposure time of the camera can be an exposure time that is relatively short in duration (e.g., relative to other exposure times that can be used with the camera) to allow the camera to capture an image of a certain quantity (e.g., 5, 10, 20) of the brightest stars in a night sky (e.g., the brightest star(s) relative to other stars in the night sky). In this or another embodiment, the computing device can implement (e.g., execute, run) the above-described focus stacking algorithm while operating the camera to capture the image using the initial exposure time such that the objects captured in the image have a relatively sharp focus or at least a relatively moderately sharp focus. In this or another embodiment, the computing device can further implement (e.g., execute, run) the pattern matching algorithm as described above to identify (e.g., attempt to identify) a certain quantity (e.g., 1, 3, 5, 7) of object(s) in the image that correspond respectively to an equal quantity (e.g., 1, 3, 5, 7) of star(s) in a star catalog. In this or another embodiment, based on identifying such a certain quantity of object(s) in the image that correspond respectively to an equal quantity of cataloged star(s), the computing device can then determine the orientation of the camera (e.g., pointing+roll) and/or define an initial camera model of the camera using such matched cataloged star(s) as reference point(s).

In example embodiments of the present disclosure, the computing device can determine the orientation of the camera and/or define a camera model of the camera (e.g., an initial camera model, an updated camera model, a final camera model) using such matched cataloged star(s) as reference point(s). For instance, as described below, in some example embodiments of the present disclosure, the computing device can determine the orientation of the camera and/or define such a camera model of the camera based at least in part on (e.g., using) location data of one or more objects in at least one image and location data of one or more cataloged stars that correspond respectively to such one or more objects.

In example embodiments of the present disclosure, to determine the orientation of the camera and/or define an initial camera model of the camera using such matched cataloged star(s) as reference point(s), the computing device can determine (e.g., using a centroiding algorithm as described below) the pixel location of each object that has been identified as corresponding to a cataloged star and obtain (e.g., using a star catalog) the true world ray of each corresponding cataloged star. In these or other example embodiments, the computing device can use the pixel location of each object and the true world ray of each corresponding cataloged star to generate a known pixel→world ray correspondence (known pixel-to-world ray correspondence) for each object and cataloged star match. In these or other example embodiments, based on identifying (e.g., via the pattern matching algorithm) multiple object and cataloged star matches in one or more images of a night sky, the computing device can then repeat the above operations to generate multiple known pixel→world ray correspondences (known pixel-to-world ray correspondences) for such multiple object and cataloged star matches. In these or other example embodiments, the computing device can then use such multiple known pixel→world ray correspondences (known pixel-to-world ray correspondences) to determine (e.g., calculate, compute) the orientation of the camera (e.g., pointing+roll) and/or define an initial camera model of the camera.

In some embodiments, the computing device can implement (e.g., execute, run) a centroiding algorithm to determine the pixel location of each object (e.g., based on the weighted centroid of each object) that has been identified (e.g., via the pattern matching algorithm) as corresponding to a cataloged star. In at least one embodiment, the computing device can implement (e.g., execute, run) a centroiding algorithm to determine the pixel location of each object to an accuracy of less than one pixel.

In one or more example embodiments, to determine (e.g., calculate, compute) the orientation of the camera (e.g., pointing+roll), the computing device can identify (e.g., attempt to identify, via the pattern matching algorithm) at least one object in an image(s) that corresponds to at least one cataloged star. For instance, in one example embodiment, to determine (e.g., calculate, compute) the orientation of the camera (e.g., pointing+roll), the computing device can identity two or more objects in at least one image that correspond respectively to two or more cataloged stars. In this or another example embodiment, the computing device can then determine (e.g., using a centroiding algorithm) the pixel location of each object and obtain (e.g., using a star catalog) the true world ray of each corresponding cataloged star to generate a known pixel→world ray correspondence (known pixel-to-world ray correspondence) for each of the two or more object and cataloged star matches. In this or another example embodiment, the computing device can then use the resulting two or more known pixel→world ray correspondences (known pixel-to-world ray correspondences) to determine (e.g., calculate, compute) the orientation of the camera (e.g., pointing+roll).

In some embodiments, to define a camera model of the camera (e.g., an initial camera model, an updated camera model, a final camera model), the computing device can identify (e.g., attempt to identify, via the pattern matching algorithm) at least one object in an image(s) that corresponds to at least one cataloged star. For instance, in one example embodiment, to define an initial camera model, the computing device can identity, for example, five or more objects in at least one image that correspond respectively to five or more cataloged stars. In this or another example embodiment, the computing device can then determine (e.g., using a centroiding algorithm) the pixel location of each object and obtain (e.g., using a star catalog) the true world ray of each corresponding cataloged star to generate a known pixel→world ray correspondence (known pixel-to-world ray correspondence) for each of the five or more object and cataloged star matches. In this or another example embodiment, the computing device can then use the resulting five or more known pixel→world ray correspondences (known pixel-to-world ray correspondences) to define the initial camera model. For example, in this or another example embodiment, the computing device can use the resulting five or more known pixel→world ray correspondences (known pixel-to-world ray correspondences) to define one or more initial intrinsic camera parameters of the camera that can include, for instance, an initial pixel size, an initial field of view, an initial lens distortion, an initial map of the lens distortion, an initial radial distortion term, an initial pixel scale, an initial optical center offset, and/or another initial intrinsic camera parameter.

It should be appreciated that stars in a night sky or a star catalog are effectively perfect point sources having positions and true world rays that are known to a fraction of an arc-second. It should also be appreciated that the computing device according to example embodiments of the present disclosure can determine the pixel locations of objects in an image that correspond to cataloged stars to an accuracy of less than a pixel as described above. As such, the computing device according to example embodiments of the present disclosure can characterize the camera model such that it constitutes a relatively high-fidelity camera model (e.g., relative to a camera model the computing device could otherwise define without implementing the disclosed technology described herein). However, in some embodiments, the above-described initial camera model that can be defined by the computing device can constitute a relatively low-fidelity camera model. For example, in embodiments where the computing device defines the initial camera model using a relatively low number of object and cataloged star matches such as, for instance, five matches, the resulting initial camera model can be relatively course, and thus, constitute a relatively low-fidelity camera model. Therefore, to improve the fidelity and/or overall quality of the initial camera model, the computing device can perform an iterative camera model update process as described in detail below to iteratively update the initial camera model (e.g., the most current updated version of the initial camera model) in accordance with one or more embodiments of the present disclosure.

According to one or more embodiments described herein, once the computing device defines the above-described initial intrinsic camera parameter(s) that can constitute the initial camera model, the computing device can update such parameter(s) and the initial camera model in an iterative manner by performing an iterative camera model update process. In at least one embodiment of the present disclosure, at one or more iterations (e.g., at each iteration) of the iterative camera model update process, the computing device can perform operations that can include, but are not limited to: increasing the exposure time of the camera to an increased exposure time; operating the camera to capture an additional image of the night sky using the increased exposure time; identifying (e.g., attempting to identify), in the additional image, one or more additional objects that correspond respectively to one or more additional cataloged stars; and/or updating the initial camera model (e.g., the most current updated version of the initial camera model) based at least in part on (e.g., using) additional location data corresponding respectively to the one or more additional objects (e.g., pixel location data associated with each of the additional object(s) identified in the additional image) and the one or more additional cataloged stars (e.g., location data of each of the additional cataloged star(s), which can be obtained from a star catalog).

In at least one embodiment, at one or more iterations (e.g., at each iteration) of the iterative camera model update process, the computing device can increase the exposure time of the camera to an increased exposure time. For example, in this or another embodiment, at one or more iterations (e.g., at each iteration) of the iterative camera model update process, the computing device can increase the most recently used exposure time to a certain increased exposure time that is longer than the above-described initial exposure time and longer than previous exposure times used in previous iterations of the iterative camera model update process. For instance, in this or another embodiment, at a first iteration of the iterative camera model update process, the computing device can increase the above-described initial exposure time to a certain first increased exposure time that is longer in duration compared to the initial exposure time. In this or another embodiment, at a second iteration of the iterative camera model update process, the computing device can increase such a certain first increased exposure time to a certain second increased exposure time that is longer in duration compared to the first increased exposure time. In this or another embodiment, at one or more subsequent iterations (e.g., at each subsequent iteration) of the iterative camera model update process, the computing device can increase the most recently used exposure time in the same manner as described above.

In at least one embodiment, at one or more iterations (e.g., at each iteration) of the iterative camera model update process, the computing device can operate the camera to capture at least one additional image of a night sky using the above-described increased exposure time. In this manner, at one or more iterations (e.g., at each iteration) of the iterative camera model update process, the computing device according to example embodiments described herein can thereby operate the camera to capture the at least one additional image that can include one or more additional objects that represent respectively one or more additional stars that each have a certain level of brightness that is less than that of other stars captured in previous images using shorter exposure times. As such, in at least one embodiment, the computing device can thereby operate the camera at one or more iterations (e.g., at each iteration) to capture at least one additional image of one or more additional stars that are each relatively dimmer compared to other stars captured in a previous image using a shorter exposure time at a previous iteration of the iterative camera model update process.

In some embodiments, the above-described increased exposure time can constitute an exposure time that is: long enough in duration to allow the camera to capture the additional star(s) described above that can each be dimmer than the stars captured in a previous image(s) at a previous iteration(s); and short enough in duration to prevent the camera from capturing other stars in the night sky that are dimmer than the additional star(s). In this manner, at one or more iterations (e.g., at each iteration) of the iterative camera model update process, the computing device according to at least one embodiment described herein can thereby limit the number of candidate matches of the additional object(s) in the additional image(s) that possibly correspond to the additional star(s). In this or another embodiment, by limiting the number of such candidate matches, which can be analyzed by the computing device as described below (e.g., via the pattern matching algorithm), the computing device can thereby limit the processing workload and/or computational costs of a processor that can be included in and/or coupled (e.g., operatively) to the computing device.

In some embodiments, the computing device can implement (e.g., execute, run) the above-described focus stacking algorithm when operating the camera at one or more iterations (e.g., at each iteration) of the iterative camera model update process to capture the additional image(s) of the night sky using the increased exposure time. In some embodiments, at one or more iterations (e.g., at each iteration) of the iterative camera model update process, the computing device can implement the focus stacking algorithm in the same manner as it can when characterizing the above-described initial camera model. For example, in these or other embodiments, at one or more iterations (e.g., at each iteration) of the iterative camera model update process, the computing device can implement the focus stacking algorithm such that at least one of the additional object(s) captured in at least one of the additional image(s) has a defined focus (e.g., a focus that is sharper (e.g., better, more focused, less blurry) relative to other objects captured in the same image). In this manner, the computing device according to at least one embodiment of the present disclosure can limit the computational costs (e.g., as described above) associated with analyzing the additional image(s) (e.g., via the pattern matching algorithm) as described below to identify (e.g., attempt to identify) at least one of the additional object(s) in at least one of the additional image(s) that correspond respectively to one or more additional cataloged stars.

In at least one embodiment, at one or more iterations (e.g., at each iteration) of the iterative camera model update process, the computing device can identify (e.g., attempt to identify), in at least one of the additional image(s), one or more additional objects that correspond respectively to one or more additional cataloged stars. In this or another embodiment, at one or more iterations (e.g., at each iteration) of the iterative camera model update process, the computing device can implement (e.g., execute, run) the above-described pattern matching algorithm (e.g., a star tracker algorithm, triangle matching algorithm) to identify (e.g., attempt to identify) the additional object(s) in the additional image(s) that correspond respectively to the additional cataloged star(s). In some embodiments, at one or more iterations (e.g., at each iteration) of the iterative camera model update process, the computing device can implement the pattern matching algorithm in the same manner as it can when characterizing the above-described initial camera model. For example, in these or other embodiments, at one or more iterations (e.g., at each iteration) of the iterative camera model update process, the computing device can implement the pattern matching algorithm to: match (e.g., attempt to match) additional triangles observed between the additional object(s) in the additional image(s) to additional known triangles between the additional cataloged star(s); and identify (e.g., attempt to identify) one or more of the additional object(s) in such additional triangles that correspond respectively to one or more of the additional cataloged star(s) in such additional known triangles.

In this manner, the computing device according to example embodiments can perform the iterative camera model update process to iteratively identify (e.g., attempt to identify, via the pattern matching algorithm as described above), in the additional image(s), the additional object(s) that correspond respectively to the additional cataloged star(s). In these or other embodiments, based on the increased exposure time, the additional cataloged star(s) can each have a defined brightness (e.g., a certain level of brightness) that is dimmer than a brightness of the above-described cataloged star(s) and a brightness of one or more previous cataloged stars that have been identified (e.g., by the computing device via the pattern algorithm), in one or more previous iterations of the iterative camera model update process, as corresponding respectively to one or more previous objects in one or more previous images captured by the camera.

In example embodiments of the present disclosure, when determining an exposure time of the camera (e.g., the initial exposure time, the increased exposure time(s)) and/or characterizing a camera model (e.g., the initial camera model, updated camera model(s), the final camera model), the computing device can implement the above-described pattern matching algorithm using one or more match parameters that define how quickly, efficiently, and/or effectively the computing device (e.g., via the pattern matching algorithm) can identify (e.g., attempt to identify) one or more objects in at least one image that correspond respectively to one or more cataloged stars. In these or other embodiments, such match parameter(s) can include and/or constitute parameter(s) associated with, for instance: any intrinsic camera parameters already known; the level of brightness of stars in the night sky that are captured in the image(s); the level of brightness and/or focus of the object(s) captured in the image(s); the level of brightness of the cataloged star(s); and/or a defined maximum amount of compute time that can be used with each execution of the pattern matching algorithm.

In at least one embodiment of the present disclosure, when determining the above-described initial exposure time and/or characterizing the above-described initial camera model, the computing device can implement (e.g., execute, run) the above-described pattern matching algorithm using one or more first match parameters. For instance, in this or another embodiment, the computing device can set (e.g., define) one or more first values for the above-described match parameters to define the one or more first match parameters and then implement the pattern matching algorithm using such first match parameter(s).

In at least one embodiment, the computing device can set (e.g., define) the value(s) of the first match parameter(s) of the pattern matching algorithm such that they are relatively broad to allow the computing device (e.g., via the pattern matching algorithm) to identify (e.g., attempt to identify) the object(s) in the image(s) that correspond respectively to the cataloged star(s) in a relatively quick, efficient, and/or effective manner. For example, in in this or another embodiment, the computing device can set (e.g., define) the first match parameter(s) of the pattern matching algorithm such that they are relatively broad to allow the computing device (e.g., via the pattern matching algorithm) to identify (e.g., attempt to identify) a certain quantity (e.g., 1, 2, 5, 10, 20) of objects in an image that correspond to an equal quantity of the relatively brightest stars in a night sky in a relatively quick, efficient, and/or effective manner. In this manner, the computing device according to example embodiments described herein can thereby limit computational costs associated with executing the pattern matching algorithm to identify (e.g., attempt to identify) a minimum and/or threshold quantity of object and catalog star matches that allow the computing device to determine the initial exposure time and/or characterize the initial camera model as described above.

In accordance with example embodiments, once the computing device has defined the initial camera model as described above, the computing device can adjust one or more of the above-described match parameters when performing the iterative camera model update process to update the initial camera model. For instance, in at least one embodiment, the computing device can iteratively adjust the value(s) of the match parameter(s) at one or more iterations (e.g., at each iteration) of the iterative camera model update process such that the match parameter(s) are set to increasingly narrower value(s) at such iteration(s) (e.g., relatively narrower, more restrictive, and/or more limiting compared to match parameter value(s) used in the previous iteration(s)).

In one embodiment, at a first iteration of the iterative camera model update process (e.g., after the initial camera model has been defined), the computing device can adjust one or more values of the first match parameter(s) to define one or more second match parameters that are relatively narrower than the first match parameter value(s) (e.g., relatively narrower, more restrictive, or more limiting compared to the first match parameter value(s)). For instance, in this or another embodiment, the computing device can adjust the value(s) of the first match parameter(s) such that the second match parameter(s) include and/or constitute, for example: one or more intrinsic camera parameters defined by the computing device when characterizing the initial camera model; a certain level of brightness of the additional star(s)

in the night sky that are captured in the additional image(s); a certain level of brightness and/or focus of the additional object(s) captured in the additional image(s); a certain level of brightness of the additional cataloged star(s); and/or a defined maximum amount of compute time that can be used to execute the pattern matching algorithm at the second iteration of the iterative camera model update process (e.g., a maximum compute time that can be the same duration or a different duration defined in the first match parameter(s)). In this or another embodiment, the computing device can then implement (e.g., execute, run) the pattern matching algorithm using the second match parameter(s) to identify (e.g., attempt to identify), in the additional image(s), the additional object(s) that correspond respectively to the additional cataloged star(s). In this or another embodiment, at one or more subsequent iterations (e.g., at each subsequent iteration) of the iterative camera model update process, the computing device can adjust (e.g., narrow) one or more of the most recently used match parameters in the same manner as described above.

According to example embodiments, at one or more iterations (e.g., at each iteration) of the iterative camera model update process, the computing device can update the initial camera model (e.g., the most current updated version of the initial camera model) based at least in part on (e.g., using) additional location data corresponding respectively to the additional object(s) and the additional cataloged star(s). For instance, in these or other example embodiments, at one or more iterations (e.g., at each iteration) of the iterative camera model update process, the computing device can update the most current updated version of the initial camera model using pixel location data associated with each of the additional object(s) in each of the additional image(s) and location data of the additional cataloged star(s) that can be obtained from a star catalog.

In some embodiments, at one or more iterations (e.g., at each iteration) of the iterative camera model update process, the computing device can update the most current updated version of the initial camera model in the same manner it can define the initial camera model as described above. For instance, in at least one embodiment, to update the most current updated version of the initial camera model at one or more iterations (e.g., at each iteration) of the iterative camera model update process, the computing device can determine (e.g., using a centroiding algorithm) the pixel location of each of the additional object(s) and obtain (e.g., using a star catalog) the true world ray of each corresponding additional cataloged star to generate a known pixel-→world ray correspondence (known pixel-to-world ray correspondence) for each of the additional object and additional cataloged star matches. In this or another embodiment, the computing device can then use the resulting known pixel-→world ray correspondences (known pixel-to-world ray correspondences) to define an updated camera model at one or more iterations (e.g., at each iteration) of the iterative camera model update process. For example, in this or another embodiment, the computing device can use the resulting known pixel→world ray correspondences (known pixel-to-world ray correspondences) to define one or more updated intrinsic camera parameters of the camera that can include, for instance, an updated pixel size, an updated field of view, an updated lens distortion, an updated map of the lens distortion, an updated radial distortion term, an updated pixel scale, an updated optical center offset, and/or another updated intrinsic camera parameter.

In accordance with at least one example embodiment of the present disclosure, the computing device can perform the iterative camera model update process as described above to iteratively update the camera model to obtain a final camera model having a defined fidelity (e.g., a certain fidelity). For instance, in this or another example embodiment, the computing device can perform the iterative camera model update process as described above to iteratively update the most current updated version of the initial camera model at one or more iterations (e.g., at each iteration) to obtain a final camera model that constitutes a relatively high-fidelity camera model (e.g., relative to a camera model the computing device could otherwise define without implementing the disclosed technology described herein).

In some embodiments, the computing device can perform the iterative camera model update process as described above to iteratively update the most current updated version of the initial camera model at one or more iterations (e.g., at each iteration) until the computing device (e.g., via the pattern matching algorithm) fails to identify at least one object in an image that corresponds respectively to at least one cataloged star. In these embodiments, based on such failure to identity at least one object and catalog star match, the most current version of the initial camera model that was defined at a preceding iteration (e.g., at an immediately preceding iteration) of the iterative camera model update process can constitute the above-described final camera model. In some embodiments, such a final camera model can constitute a relatively high-fidelity camera model (e.g., relative to a camera model the computing device could otherwise define without implementing the disclosed technology described herein). In some embodiments, the computing device can perform the iterative camera model update process as described above to iteratively update the most current updated version of the initial camera model at one or more iterations (e.g., at each iteration) until the computing device determines that an updated version of the initial camera model (e.g., the most current updated version of the initial camera model) has a certain fidelity (e.g., a relatively high-fidelity compared to a camera model the computing device could otherwise define without implementing the disclosed technology described herein).

According to one or more embodiments of the present disclosure, the computing device can perform one or more visual positioning operations based at least in part on (e.g., using) the above-described final camera model. For example, in at least one embodiment, the computing device can store the final camera model in a memory and/or a memory device such as, for instance, one or more computer-readable media (e.g., storage media) that can be included in and/or coupled (e.g., operatively) to the computing device. In this or another embodiment, such one or more computer-readable media can include, constitute, be coupled to (e.g., operatively), and/or otherwise be associated with one or more non-transitory computer-readable media. In this or another embodiment, the computing device can further access the final camera model from such a memory and/or memory device to perform one or more visual positioning operations that can be associated with one or more applications (e.g., visual positioning application(s)) such as, for instance, localizing the camera, generating map data from imagery, implementing and/or supporting augmented reality experiences, and/or another operation.

Example aspects of the present disclosure provide several technical effects, benefits, and/or improvements in computing technology. For instance, according to example embodiments the present disclosure, a computing device such as, for instance, computing device 110 described below with reference to the example embodiments depicted in FIGS. 1 and 2, can characterize an undefined camera model of a camera and/or a camera lens that can be included in and/or coupled (e.g., operatively) to the computing device. As such, the technology of the present disclosure according to example embodiments described herein can thereby eliminate the inconvenient and/or costly task of taking such a computing device (e.g., computing device 110) to a lab to perform a camera model characterization process and/or to take measurements associated with the camera and/or camera lens coupled to the device to calculate the camera model.

Additionally, the manner in which such a computing device (e.g., computing device 110) can characterize an initial camera model and/or iteratively update such a model to obtain a final camera model in accordance with example embodiments described herein can limit the computational time and/or costs associated with performing either or both of such procedures. For instance, by capturing an image of a certain quantity (e.g., 5, 10, 20) of the relatively brightest star(s) in a night sky using a focus stacking algorithm as described herein, the computing device according to at least one embodiment of the present disclosure can thereby limit the number of candidate matches of objects in an image that possibly correspond to stars in a star catalog and/or limit the compute time it takes the computing device to determine (e.g., via the pattern matching algorithm) whether one or more of such objects correspond respectively to one or more cataloged stars. In this or another embodiment, by limiting the number of candidate matches and/or the compute time it takes the computing device to determine (e.g., via the pattern matching algorithm) whether one or more of such objects correspond respectively to one or more cataloged stars as described above, the computing device can thereby limit the processing workload, the processing time, and/or computational costs of a processor that can be included in and/or coupled (e.g., operatively) to the computing device.

Further, the manner in which the computing device can iteratively update the initial camera model to obtain a final camera model in accordance with example embodiments described herein can limit the computational time and/or costs associated with performing such a procedure. For instance, by iteratively increasing the exposure time of the camera, narrowing match parameter(s) of the pattern matching algorithm, and updating the initial camera model at one or more iterations (e.g., at each iteration) of the iterative camera model update process as described herein, the computing device according to at least one embodiment of the present disclosure can thereby limit the compute time and/or costs involved with computing the final camera model. For example, in this or another embodiment, by performing the iterative camera model update process as described herein, the computing device can iteratively match increasingly more and dimmer objects in captured images with increasingly more and dimmer stars in a star catalog, thereby reducing compute time and/or costs involved with obtaining the final camera model.

Example Devices and Systems

FIG. 1 illustrates a block diagram of an example, non-limiting device 100 according to one or more example embodiments of the present disclosure. In the example embodiment depicted in FIG. 1, device 100 can constitute, include, be coupled to (e.g., operatively), and/or otherwise be associated with a computing device 110.

Computing device 110 according to example embodiments of the present disclosure can constitute, for instance, a client computing device, a computer, a laptop, a cellular phone, a smartphone, a tablet, a wearable computing device (e.g., smart glasses, smart watch), an action camera, a dashboard camera, an omnidirectional camera, and/or another computing device. As illustrated in the example embodiment depicted in FIG. 1, computing device 110 can include one or more processors 112, memory 114, an associated display device 128, and/or a camera 130.

Processor(s) 112 according to example embodiments described herein can each be a processing device. For example, in the example embodiment depicted in FIG. 1, processor(s) 112 can each be a central processing unit (CPU), microprocessor, microcontroller, integrated circuit (e.g., an application specific integrated circuit (ASIC)), and/or another type of processing device.

Memory 114 according to example embodiments described herein can store computer-readable and/or computer executable entities (e.g., data, information, applications, models, algorithms) that can be created, modified, accessed, read, retrieved, and/or executed by each of processor(s) 112. In some embodiments, memory 114 can constitute, include, be coupled to (e.g., operatively), and/or otherwise be associated with a computing system and/or media such as, for example, one or more computer-readable media, volatile memory, non-volatile memory, random-access memory (RAM), read only memory (ROM), hard drives, flash drives, and/or other memory devices. In these or other embodiments, such one or more computer-readable media can include, constitute, be coupled to (e.g., operatively), and/or otherwise be associated with one or more non-transitory computer-readable media. In the example embodiment depicted in FIG. 1, memory 114 can include data 116 (e.g., structured data, unstructured data, application specific data), instructions 118, focus stacking algorithm 120, pattern matching algorithm 122, centroiding algorithm 124, and/or one or more visual positioning applications 126.

Data 116 according to example embodiments described herein can include, for instance, a camera model 132 and/or camera model data associated therewith that can be defined (e.g., created, characterized), retrieved, manipulated, and/or stored by each of processor(s) 112. In some embodiments, camera model 132 can include and/or constitute one or more intrinsic camera parameters such as, for instance, a field of view, a lens distortion, a map of the lens distortion, a radial distortion term, a pixel scale, an optical center offset, and/or another intrinsic camera parameter. In example embodiments described herein, such intrinsic camera parameter(s) can characterize the optical, geometric, and/or digital characteristics of camera 130 and/or a camera lens thereof (not illustrated) and effectively link pixel coordinates of an object or a point in an image with corresponding coordinates in a camera reference frame of the camera.

In some embodiments, camera model 132 can constitute one or more of the camera models described herein in accordance with one or more embodiments. For example, in one embodiment, camera model 132 can constitute the initial camera model, the most current updated version of the initial camera model, and/or the final camera model described herein in accordance with one or more embodiments. In this or another embodiment, camera model 132 can constitute one or more of the above-described intrinsic camera parameter(s) that can characterize the initial camera model, the most current updated version of the initial camera model, and/or the final camera model described herein in accordance with one or more embodiments.

In at least one embodiment, data 116 can include data that can be used to characterize and/or implement (e.g., apply) camera model 132 in accordance with example embodiments of the present disclosure. For example, in this or another embodiment, data 116 can include data such as, for instance, one or more parameters (e.g., parameter values) that can be used by computing device 110 to implement (e.g., execute, run) focus stacking algorithm 120, pattern matching algorithm 122, and/or centroiding algorithm 124 as described herein to characterize camera model 132 in accordance with example embodiments of the present disclosure. In some embodiments, data 116 can include algorithm output data that can be indicative of and/or descriptive of one or more outputs corresponding respectively to focus stacking algorithm 120, pattern matching algorithm 122, and/or centroiding algorithm 124 when implemented (e.g., executed, run) by computing device 110 as described herein to characterize camera model 132 in accordance with example embodiments of the present disclosure.

In another embodiment, data 116 can include data (e.g., a pointer, an identifier) that can be indicative of and/or descriptive of a location (e.g., a database) where cataloged star data (e.g., star positions data) can be stored and/or accessed (e.g., accessed by computing device 110) to facilitate characterization of camera model 132 in accordance with example embodiments described herein. In another embodiment, data 116 can include exposure time data that can be indicative of and/or descriptive of one or more exposure times (e.g., the initial exposure time, the increased exposure time) that can be used when operating camera 130 in accordance with example embodiments of the present disclosure. In another embodiment, data 116 can include application data that can be associated with and/or used to implement (e.g., execute, run) visual positioning application(s) 126 in accordance with example embodiments of the present disclosure.

In some embodiments, data 116 can include image data that can be indicative of and/or descriptive of one or more images of, for instance, stars in a night sky that can be captured by computing device 110 using camera 130. For example, in these or other embodiments, data 116 can include one or more images that can be captured (e.g., via camera 130) and/or used by computing device 110 to characterize camera model 132. Additionally, or alternatively, in these or other embodiments, data 116 can include one or more images that can be captured by computing device 110 (e.g., via camera 130) when using camera model 132 (e.g., when using camera model 132 to implement visual positioning application(s) 126).

In some embodiments, data 116 can include video data that can be indicative of and/or descriptive of one or more videos that can be captured by computing device 110 using camera 130. For example, in these or other embodiments, data 116 can include one or more videos that can be captured by computing device 110 (e.g., via camera 130) when using camera model 132 (e.g., when using camera model 132 to implement visual positioning application(s) 126).

Instructions 118 according to example embodiments described herein can include, for example, any computer-readable and/or computer executable instructions (e.g., software, routines, processing threads) that, when executed by processor(s) 112, cause computing device 110 to perform one or more certain operations. For example, in some embodiments, instructions 118 can include instructions that, when executed by processor(s) 112, can cause computing device 110 to perform operations to characterize an undefined camera model of a computing device camera. For instance, instructions 118 can include instructions that, when executed by processor(s) 112, can cause computing device 110 to perform operations to characterize camera model 132 of camera 130 in accordance with one or more embodiments of the present disclosure.

Focus stacking algorithm 120, pattern matching algorithm 122, and/or centroiding algorithm 124 according to example embodiments described herein can each be implemented (e.g., executed, run) by computing device 110 (e.g., via processor(s) 112) to facilitate characterizing an undefined camera model of a computing device camera. In the example embodiment depicted in FIG. 1, computing device 110 (e.g., via processor(s) 112) can implement (e.g., execute, run) focus stacking algorithm 120 when operating camera 130 to capture one or more images of stars in a night sky such that at least one of the image(s) includes one or more objects that have a defined focus (e.g., a focus that is sharper (e.g., better, more focused, less blurry) relative to other objects captured in the same image). In this or another embodiment, computing device 110 (e.g., via processor(s) 112) can implement (e.g., execute, run) pattern matching algorithm 122 (e.g., a star tracker algorithm, triangle matching algorithm) and/or centroid algorithm 124 to identify certain object(s) in such image(s) that correspond to certain star(s) (e.g., cataloged star(s)) in the night sky in accordance with example embodiments described herein.

Visual positioning application(s) 126 can each constitute and/or include an application that can use, be based on, and/or otherwise be associated with camera model 132. In one example embodiment, visual positioning application(s) 126 can include an application that can localize camera 130 and/or support computing device 110 in localizing camera 130 using camera model 132. In another example embodiment, visual positioning application(s) 126 can include an application (e.g., a digital mapping application) that can generate map data from imagery (e.g., imagery captured by camera 130) and/or support computing device 110 in generating map data from such imagery using camera model 132. In another example embodiment, visual positioning application(s) 126 can include an application (e.g., an augmented reality application) that can implement and/or support augmented reality experiences using camera model 132 and/or allow for computing device 110 to implement and/or support augmented reality experiences using camera model 132.

Associated display device 128 according to example embodiments described herein can be any type of display device that can be configured to display image data (e.g., images captured by camera 130) and can be coupled to, included with, and/or otherwise associated with computing device 110. For example, in at least one embodiment, associated display device 128 can be a monitor, a screen, and/or a display device that can include, but is not limited to a smartphone screen, a tablet screen, a laptop display device, a communicatively connected display device, and/or another associated monitor, screen, and/or display device.

Camera 130 according to example embodiments described herein can be any device capable of capturing image data that can be indicative of one or more images. For example, camera 130) can constitute and/or include a digital camera, an analog camera, an integrated camera, and/or another camera that can be included in, coupled to, and/or otherwise associated with computing device 110.

According to example embodiments of the present disclosure, computing device 110 can facilitate characterizing an undefined camera model of camera 130 and/or a camera lens (not illustrated) that can be included in and/or coupled (e.g., operatively) to computing device 110 and/or camera 130. In at least one embodiment of the present disclosure, to characterize an undefined camera model of camera 130 and/or such a camera lens, computing device 110 can perform the above-described operations that can include, but are not limited to: determining an initial exposure time of camera 130 that allows computing device 110 to use pattern matching algorithm 122 and/or centroiding algorithm 124 to identify, in an image of a night sky that can be captured by camera 130 using the initial exposure time and focus stacking algorithm 120, one or more objects that correspond respectively to one or more cataloged stars (e.g., to one or more stars in a star catalog); defining an initial version of camera model 132 based at least in part on (e.g., using) location data associated respectively with the one or more objects (e.g., pixel location data associated with each of the object(s) in the image) and the one or more cataloged stars (e.g., location data of each of the cataloged star(s), which can be obtained (e.g., by computing device 110) from a star catalog); and/or performing the above-described iterative camera model update process to iteratively update the initial version of camera model 132.

In the above embodiment, at one or more iterations (e.g., at each iteration) of the iterative camera model update process, computing device 110 can perform additional operations described above that can include, but are not limited to: increasing the exposure time to an increased exposure time; operating camera 130 to capture an additional image of the night sky using the increased exposure time and focus stacking algorithm 120; implementing (e.g., executing, running) pattern matching algorithm 122 and/or centroiding algorithm 124 to attempt to identify, in the additional image, one or more additional objects that correspond respectively to one or more additional cataloged stars; and/or updating the most current updated version of camera model 132 based at least in part on (e.g., using) additional location data corresponding respectively to the one or more additional objects (e.g., pixel location data associated with each of the additional object(s) identified in the additional image) and the one or more additional cataloged stars (e.g., location data of each of the additional cataloged star(s), which can be obtained (e.g., by computing device 110) from a star catalog).

In some embodiments, computing device 110 can perform the iterative camera model update process as described above to iteratively update the most current updated version of camera model 132 at one or more iterations (e.g., at each iteration) until computing device 110 (e.g., via pattern matching algorithm 122 and/or centroiding algorithm 124) fails to identify at least one object in an image that corresponds respectively to at least one cataloged star. In these embodiments, based on such failure to identity at least one object and catalog star match, the most current version of camera model 132 that was defined at a preceding iteration (e.g., at an immediately preceding iteration) of the iterative camera model update process can constitute a final version of camera model 132. In some embodiments, such a final version of camera model 132 can constitute a relatively high-fidelity camera model (e.g., relative to a camera model that computing device 110 could otherwise define without implementing the disclosed technology described herein). In some embodiments, computing device 110 can perform the iterative camera model update process as described above to iteratively update the most current updated version of camera model 132 at one or more iterations (e.g., at each iteration) until computing device 110 determines that camera model 132 has a certain fidelity (e.g., a relatively high-fidelity compared to a camera model that computing device 110 could otherwise define without implementing the disclosed technology described herein).

According to one or more embodiments of the present disclosure, computing device 110 can perform one or more visual positioning operations based at least in part on (e.g., using) the above-described final version of camera model 132. For example, in at least one embodiment, computing device 110 can store the final version of camera model 132 in memory 114. In this or another embodiment, computing device 110 can further access the final version of camera model 132 from memory 114 to perform one or more visual positioning operations that can be associated with one or more applications (e.g., visual positioning application(s)) such as, for instance, localizing camera 130, generating map data from imagery, implementing and/or supporting augmented reality experiences, and/or another operation.

Figure 2:
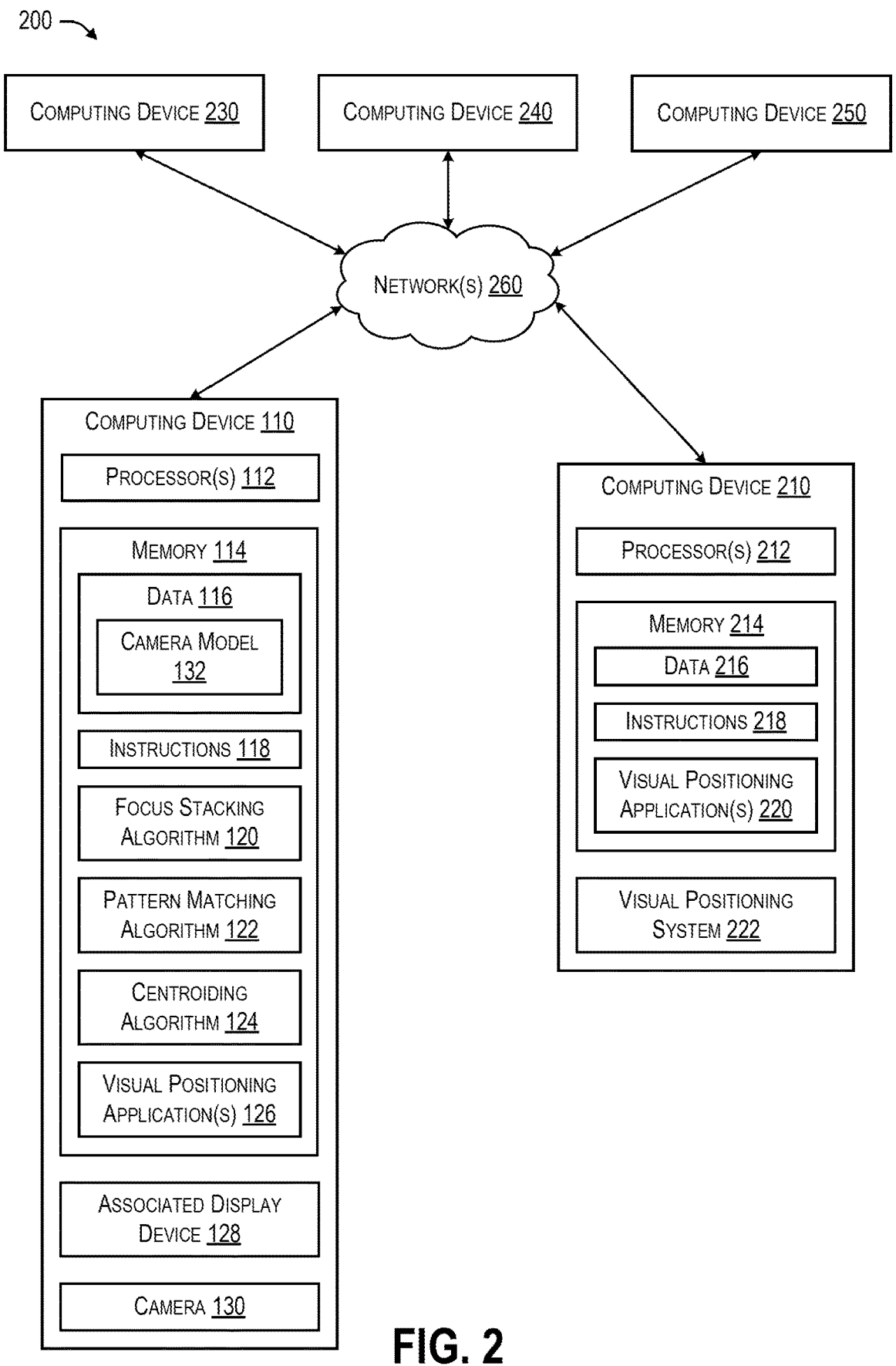
FIG. 2 illustrates a block diagram of an example, non-limiting visual positioning environment according to one or more example embodiments of the present disclosure.

FIG. 2 illustrates a block diagram of an example, non-limiting visual positioning environment 200 according to one or more example embodiments of the present disclosure. As illustrated in the example embodiment depicted in FIG. 2, visual positioning environment 200 can include one or more computing devices 110, 210, 230, 240, 250 that can be coupled (e.g., communicatively, operatively) to one another through one or more networks 260. Although five computing devices 110, 210, 230, 240, 250 are depicted in the example embodiment illustrated in FIG. 2, any number of computing devices can be included in visual positioning environment 200 and coupled (e.g., communicatively, operatively) to one another over network(s) 260.

In one or more embodiments of the present disclosure, computing devices 230, 240, 250 can each be, for example, a client computing device, a computer, a laptop, a cellular phone, a smartphone, a tablet, a wearable computing device (e.g., smart glasses, smart watch), an action camera, a dashboard camera, an omnidirectional camera, and/or another computing device. In some embodiments, computing devices 230, 240, 250 can each be the same type of computing device and/or include the same components, structure, attributes, and/or functionality as that of computing device 110. In some embodiments, computing devices 230, 240, 250 can each be a different type of computing device and/or include components, structure, attributes, and/or functionality that are different from that of computing device 110.

Although not illustrated in the example embodiment depicted in FIG. 2, in at least one embodiment of the present disclosure, computing device 230, 240, and/or 250 can include processor(s) 112, memory 114, associated display device 128, and/or camera 130) described above with reference to FIG. 1. In this or another embodiment, although not illustrated in the example embodiment depicted in FIG. 2, memory 114 that can be included in computing device 230, 240, and/or 250 can include data 116 (e.g., structured data, unstructured data, application specific data), instructions 118, focus stacking algorithm 120, pattern matching algorithm 122, centroiding algorithm 124, and/or visual positioning application(s) 126 described above with reference to FIG. 1. In this or another embodiment, although not illustrated in the example embodiment depicted in FIG. 2, data 116 that can be included in computing device 230, 240, and/or 250) can include camera model 132 and/or associated camera model data described above with reference to FIG. 1. In this or another embodiment, computing device 230, 240, and/or 250 can respectively characterize a camera model 132 as described above with reference to FIG. 1 such that each camera model 132 is specific to and/or corresponds to each camera 130 that can be included in and/or coupled to computing device 230, 240, and/or 250.

In one or more embodiments of the present disclosure, computing device 210 can be, for example, a computer, a server, a host server, and/or any other computing device that can be configured such that it can be used to implement (e.g., execute, run), operate, and/or manage one or more visual positioning systems and/or one or more visual positioning applications. As illustrated in the example embodiment depicted in FIG. 2, computing device 210 can include one or more processors 212, memory 214, and/or a visual positioning system 222.

As referenced herein, the term "system" can refer to hardware (e.g., application specific hardware), computer logic that executes on a general-purpose processor (e.g., a central processing unit (CPU)), and/or some combination thereof. In some embodiments, a "system" (e.g., visual positioning system 222) can be implemented in hardware, application specific circuits, firmware, and/or software controlling a general-purpose processor. In some embodiments, a "system" (e.g., visual positioning system 222) can be implemented as program code files stored on a storage device (e.g., memory 214), loaded into memory and executed by a processor (e.g., processor(s) 212), and/or can be provided from computer program products, for example, computer-executable instructions that are stored in a tangible computer-readable storage medium (e.g., memory 214, random-access memory (RAM), hard disk, optical media, magnetic media).

Processor(s) 212 according to example embodiments described herein can each be a processing device. For example, in the example embodiment depicted in FIG. 2, processor(s) 212 can each be a central processing unit (CPU), microprocessor, microcontroller, integrated circuit (e.g., an application specific integrated circuit (ASIC)), and/or another type of processing device. In some embodiments, processor(s) 212 can each be the same type of processor and/or include the same components, structure, attributes, and/or functionality as that of processor(s) 112. In some embodiments, processor(s) 212 can each be a different type of processor and/or include components, structure, attributes, and/or functionality that are different from that of processor(s) 112.

Memory 214 according to example embodiments described herein can store computer-readable and/or computer executable entities (e.g., data, information, applications, models, algorithms, etc.) that can be created, modified, accessed, read, retrieved, and/or executed by each of processor(s) 212. In some embodiments, memory 214 can constitute, include, be coupled to (e.g., operatively), and/or otherwise be associated with a computing system and/or media such as, for example, one or more computer-readable media, volatile memory, non-volatile memory, random-access memory (RAM), read only memory (ROM), hard drives, flash drives, and/or other memory devices. In these or other embodiments, such one or more computer-readable media can include, constitute, be coupled to (e.g., operatively), and/or otherwise be associated with one or more non-transitory computer-readable media.

In the example embodiment depicted in FIG. 2, memory 214 can include data 216 (e.g., structured data, unstructured data, application specific data), instructions 218, and/or one or more visual positioning applications 220. In some embodiments, memory 214 can be the same type of memory and/or include the same components, structure, attributes, and/or functionality as that of memory 114. In some embodiments, memory 214 can be a different type of memory and/or include components, structure, attributes, and/or functionality that are different from that of memory 114.

In at least one embodiment, data 216 can include data that can be used by computing device 210 to implement (e.g., execute, run), operate, and/or manage visual positioning application(s) 220 and/or visual positioning system 222 in accordance with example embodiments of the present disclosure. For example, in this or another embodiment, data 216 can include data that can be associated with, specific to, and/or received from computing device 110, 230, 240, and/or 250 over network(s) 260. For instance, in some embodiments, data 216 can include data that can be indicative of and/or descriptive of: an identity of computing device 110, 230, 240, and/or 250 (e.g., a device identification number, serial number, model number); a location of computing device 110, 230, 240, and/or 250; device specific application data associated with and/or used by at least one visual positioning application 126 that can run on computing device 110, 230, 240, and/or 250. In some embodiments, data 216 can include one or more camera model(s) 132 that can be specific to and/or correspond respectively to computing device 110, 230, 240, and/or 250.

In some embodiments, data 216 can be transmitted over network(s) 260 (e.g., during operation of visual positioning application(s) 220 and/or visual positioning system 222) to computing device 210 by any of computing devices 110, 230, 240, 250, respectively. In some embodiments, data 116 and/or data 216 can be accessed by and/or displayed to (e.g., during operation of visual positioning application(s) 220 and/or visual positioning system 222) one or more users of computing device 110, 230, 240, and/or 250.

In some embodiments, data 216 can include image data that can be indicative of and/or descriptive of one or more images of, for instance, stars in a night sky that can be captured by and/or received from computing device 110, 230, 240, and/or 250, respectively, over network(s) 260. For example, in these or other embodiments, data 216 can include one or more images that can be captured (e.g., via camera 130) and/or used by computing device 110, 230, 240, and/or 250, respectively, to characterize camera model 132 of such device(s). Additionally, or alternatively, in these or other embodiments, data 216 can include one or more images that can be captured by computing device 110, 230, 240, and/or 250, respectively, when using camera model 132 of such device(s) (e.g., when using camera model 132 to implement visual positioning application(s) 126 on such device(s)).

In some embodiments, data 216 can include video data that can be indicative of and/or descriptive of one or more videos that can be captured by and/or received from computing device 110, 230, 240, and/or 250, respectively, over network(s) 260. For example, in these or other embodiments, data 216 can include one or more videos that can be captured by computing device 110, 230, 240, and/or 250, respectively, when using camera model 132 of such device(s) (e.g., when using camera model 132 to implement visual positioning application(s) 126 on such device(s)).

Instructions 218 according to example embodiments described herein can include, for example, any computer-readable and/or computer executable instructions (e.g., software, routines, processing threads) that, when executed by processor(s) 212, cause computing device 210 to perform one or more certain operations. For example, in some embodiments, instructions 218 can include instructions that, when executed by processor(s) 212, can cause computing device 210 to perform operations to implement (e.g., execute, run), operate, and/or manage visual positioning application(s) 220 and/or visual positioning system 222 in accordance with example embodiments of the present disclosure.

Visual positioning application(s) 220 can each constitute and/or include an application that can use, be based on, and/or otherwise be associated with camera model(s) 132 that can be specific to and/or correspond respectively to computing device 110, 230, 240, and/or 250. In some embodiments, visual positioning application(s) 220 can be the same type of application(s) and/or include the same components, structure, attributes, and/or functionality as that of visual positioning application(s) 126. In some embodiments, visual positioning application(s) 220 can be a different type(s) of application(s) compared to visual positioning application(s) 126 and/or include components, structure, attributes, and/or functionality that are different from that of visual positioning application(s) 126.

In one example embodiment, visual positioning application(s) 220 can include an application that can localize each camera 130 of computing device 110, 230, 240, and/or 250) and/or support each of such computing device(s) in localizing each camera 130 using camera model(s) 132 that can correspond respectively to computing device 110, 230, 240, and/or 250. In another example embodiment, visual positioning application(s) 220 can include an application (e.g., a digital mapping application) that can generate map data from imagery (e.g., imagery captured by camera(s) 130 of some computing device 110, 230, 240, and/or 250) and/or support computing device 110, 230, 240, and/or 250 in generating map data from such imagery using camera model(s) 132 that can correspond respectively to computing device 110, 230, 240, and/or 250. In another example embodiment, visual positioning application(s) 220 can include an application (e.g., an augmented reality application) that can implement and/or support augmented reality experiences using camera model(s) 132 that can correspond respectively to computing device 110, 230, 240, and/or 250 and/or allow for such computing device(s) to implement and/or support augmented reality experiences using such camera model(s) 132.

Visual positioning system 222 according to example embodiments described herein can constitute and/or include a "system" as defined above that can be implemented by computing device 210 (e.g., via processor(s) 212). In some embodiments, computing device 210 (e.g., via processor(s) 212) can implement visual positioning system 222 to operate, support, and/or manage visual positioning application(s) 220 that can be executed respectively by any of computing devices 110, 230, 240, and/or 250. In some embodiments, computing device 210 (e.g., via processor(s) 212) can implement visual positioning system 222 to perform one or more visual positioning operations associated with such visual positioning application(s) 220 and/or computing devices 110, 230, 240, and/or 250.

In the example embodiment depicted in FIG. 2, visual positioning system 222 can be configured to facilitate operation of visual positioning application(s) 220 that can be respectively executed by any of computing devices 110, 230, 240, and/or 250. In this or another example embodiment, visual positioning system 222 can receive image data (e.g., one or more images), video data (e.g., one or more video streams), and/or camera model data (e.g., camera model 132 and/or intrinsic camera parameter(s)) from any of computing devices 110, 230, 240, and/or 250 (e.g., via network(s) 260). In this or another example embodiment, such data can constitute input(s) to, output(s) of, and/or otherwise be associated with the operation and/or functionality of visual positioning application(s) 220. In this or another example embodiment, based at least in part on (e.g., in response to) receiving such data, visual positioning system 222 can use the data to perform one or more visual positioning operations associated with such visual positioning application(s) 220 and/or computing devices 110, 230, 240, and/or 250.

In one example embodiment, visual positioning system 222 can use the above-described image data, video data, and/or camera model data to generate map data that can be associated with and/or used by a digital mapping application that can be executed respectively by computing device 110, 230, 240, and/or 250. In another example embodiment, visual positioning system 222 can use such data to implement and/or support augmented reality experiences that can be associated with and/or used by an augmented reality application that can be executed respectively by computing device 110, 230, 240, and/or 250. For instance, in the above example embodiments, visual positioning system 222 can use such data to facilitate projection of digital pixels to real, physical entities in the real, physical world, which can thereby support functionality of the digital mapping application, the augmented reality application, and/or computing device 110, 230, 240, and/or 250.

Network(s) 260 according to example embodiments described herein can be any type of communications network such as, for example, a local area network (e.g., intranet), wide area network (e.g., Internet), and/or some combination thereof. In some embodiments, communication between any of computing devices 110, 210, 230, 240, and/or 250 can be carried via network interface with network(s) 260 using any type of wired and/or wireless connection, using a variety of communication protocols, encodings or formats, and/or protection schemes. For example, in at least one embodiment, communication between such devices can be carried via network interface with network(s) 260 using: communication protocols such as, for instance, transmission control protocol/internet protocol (TCP/IP), hypertext transfer protocol (HTTP), simple mail transfer protocol (SMTP), file transfer protocol (FTP), user datagram protocol (UDP), real-time transport protocol (RTP), and/or real-time transport control protocol (RTCP); encodings or formats such as, for instance, hypertext markup language (HTML) and/or extensible markup language (XML); and/or protection schemes such as, for instance, virtual private network (VPN), secure HTTP, secure shell (SSH), secure sockets layer (SSL), and/or secure real-time transport protocol (SRTP).

Example Methods

Figure 3:
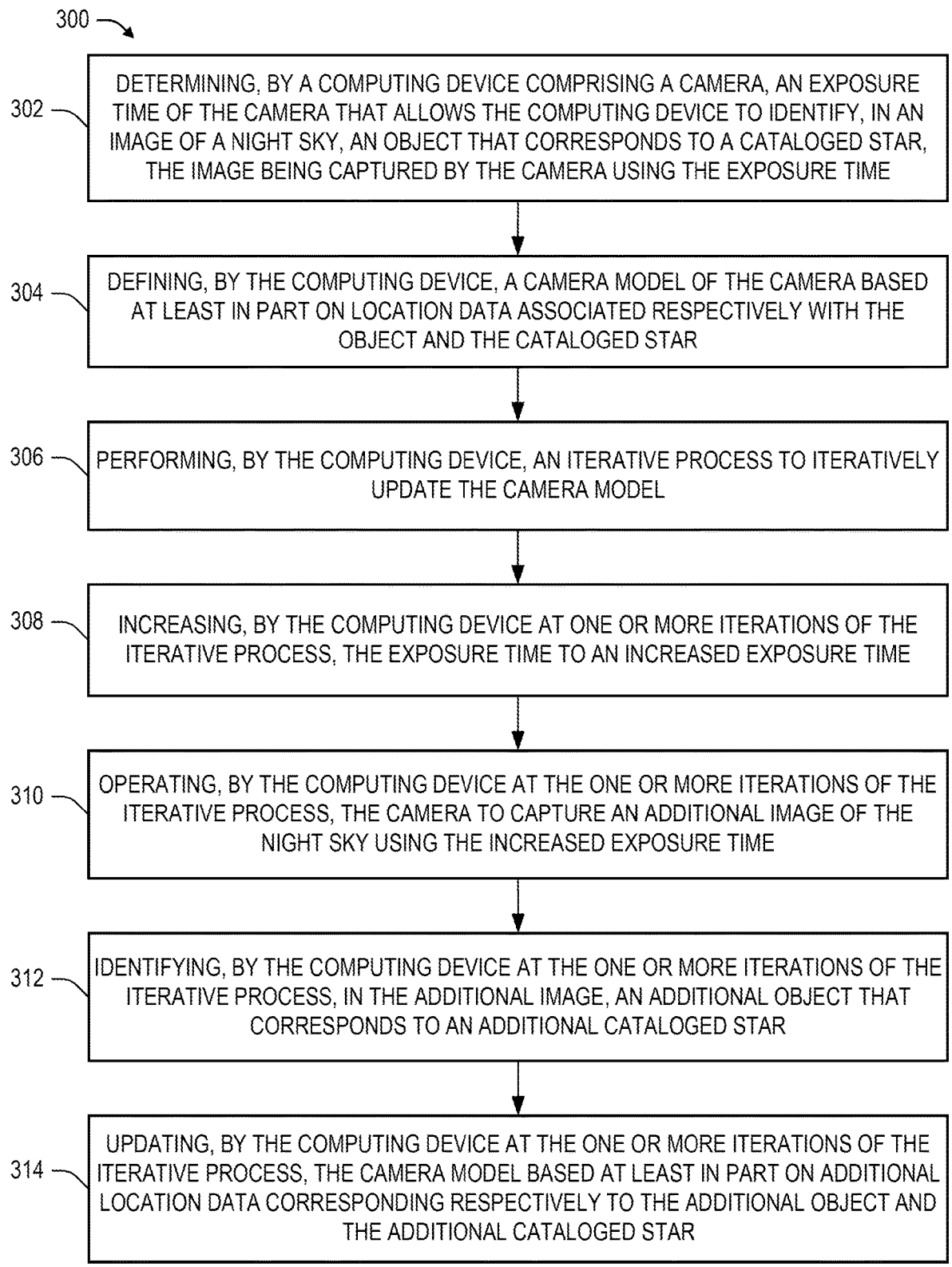
FIGS. 3 and 4 each illustrate a flow diagram of an example, non-limiting computer-implemented method according to one or more example embodiments of the present disclosure.

FIG. 3 illustrates a flow diagram of an example, non-limiting computer-implemented method 300 according to one or more example embodiments of the present disclosure. Computer-implemented method 300 can be implemented using, for instance, computing device 110, 230, 240, or 250 described above with reference to the example embodiments depicted in FIGS. 1 and 2.

The example embodiment illustrated in FIG. 3 depicts operations performed in a particular order for purposes of illustration and discussion. Those of ordinary skill in the art, using the disclosures provided herein, will understand that various operations or steps of computer-implemented method 300 or any of the other methods disclosed herein may be adapted, modified, rearranged, performed simultaneously, include operations not illustrated, and/or modified in various ways without deviating from the scope of the present disclosure.

At 302, computer-implemented method 300 can include determining, by a computing device (e.g., computing device 110) comprising a camera (e.g., camera 130)), an exposure time (e.g., an initial exposure time) of the camera that allows the computing device to identify (e.g., via pattern matching algorithm 122 and/or centroiding algorithm 124), in an image of a night sky, an object that corresponds to a cataloged star, the image being captured by the camera using the exposure time (e.g., and using focus stacking algorithm 120). For example, computing device 110 can determine an initial exposure time of camera 130 that allows computing device 110 to identify (e.g., via pattern matching algorithm 122 and/or centroiding algorithm 124), in an image of a night sky that can be captured by camera 130 using the exposure time (e.g., and using focus stacking algorithm 120), at least one object that corresponds respectively to at least one cataloged star.

In some embodiments, to determine such an initial exposure time of camera 130, computing device 110 can perform the above-described iterative initial exposure time process (e.g., a trial and error process) that can include: operating camera 130 and implementing (e.g., executing, running) focus stacking algorithm 120 to capture multiple images of the night sky over multiple iterations using a different exposure time at each iteration such that each image is captured using a different exposure time; and/or implementing (e.g., executing, running) pattern matching algorithm 122 (e.g., a star tracker algorithm, triangle matching algorithm) and/or centroiding algorithm 124 at each iteration to attempt to identify, in each image captured at each iteration, one or more objects that correspond respectively to one or more cataloged stars. In these or other embodiments, a certain exposure time used to capture a certain image in which computing device 110 is able to identify (e.g., via pattern matching algorithm 122 and/or centroiding algorithm 124) one or more objects that correspond respectively to one or more cataloged stars can thereby constitute the initial exposure time that allows computing device 110 to make such an identification.

At 304, computer-implemented method 300 can include defining, by the computing device, a camera model (e.g., an initial version of camera model 132) of the camera based at least in part on location data associated respectively with the object and the cataloged star. In some embodiments, computing device 110 can define one or more different versions of camera model 132 (e.g., an initial version of camera model 132, an updated version of camera model 132, a final version of camera model 132) by: identifying (e.g., attempting to identify, via pattern matching algorithm 122 and/or centroiding algorithm 124) at least one object in an image that corresponds respectively to at least one cataloged star; and using pixel location data of the at least one object and location data of the at least one cataloged star to define one or more initial intrinsic camera parameters of camera 130 as described below.

In one example embodiment, computing device 110 can define an initial version of camera model 132 by identifying (e.g., using pattern matching algorithm 122), for instance, five or more objects in at least one image that correspond respectively to five or more cataloged stars. In this or another example embodiment, computing device 110 can then determine (e.g., using centroiding algorithm 124) the pixel location of each object and obtain (e.g., using a star catalog) the true world ray of each corresponding cataloged star to generate a known pixel→world ray correspondence (known pixel-to-world ray correspondence) for each of the five or more object and cataloged star matches. In this or another example embodiment, computing device 110 can then use the resulting five or more known pixel→world ray correspondences (known pixel-to-world ray correspondences) to define an initial version of camera model 132. For example, in this or another example embodiment, computing device 110 can use the resulting five or more known pixel-→world ray correspondences (known pixel-to-world ray correspondences) to define one or more initial intrinsic camera parameters of camera 130 that can include, for instance, an initial pixel size, an initial field of view, an initial lens distortion, an initial map of the lens distortion, an initial radial distortion term, an initial pixel scale, an initial optical center offset, and/or another initial intrinsic camera parameter.

At 306, computer-implemented method 300 can include performing, by the computing device, an iterative process to iteratively update the camera model. For example, computing device 110 can perform the iterative camera model update process described above and below at operations 308-314 to iteratively update the initial version of camera model 132.

At 308, computer-implemented method 300 can include increasing, by the computing device at one or more iterations of the iterative process, the exposure time to an increased exposure time. For example, at one or more iterations (e.g., at each iteration) of the iterative camera model update process, computing device 110 can increase the exposure time of camera 130 to an exposure time having a duration that is longer compared to that of the above-described initial exposure time and any previously used exposure time.

In at least one embodiment, at one or more iterations (e.g., at each iteration) of the iterative camera model update process, computing device 110 can increase the most recently used exposure time to a certain increased exposure time that is longer than the above-described initial exposure time and longer than previous exposure times used in previous iterations of the iterative camera model update process. For instance, in this or another embodiment, at a first iteration of the iterative camera model update process, computing device 110 can increase the above-described initial exposure time to a certain first increased exposure time that is longer in duration compared to the initial exposure time. In this or another embodiment, at a second iteration of the iterative camera model update process, computing device 110 can increase such a certain first increased exposure time to a certain second increased exposure time that is longer in duration compared to the first increased exposure time. In this or another embodiment, at one or more subsequent iterations (e.g., at each subsequent iteration) of the iterative camera model update process, computing device 110 can increase the most recently used exposure time in the same manner as described above.

At 310, computer-implemented method 300 can include operating, by the computing device at the one or more iterations of the iterative process, the camera to capture an additional image of the night sky using the increased exposure time. For example, at one or more iterations (e.g., at each iteration) of the iterative camera model update process, computing device 110 can operate camera 130 to capture at least one additional image of the night sky using the increased exposure time and focus stacking algorithm 120.

In at least one embodiment, at one or more iterations (e.g., at each iteration) of the iterative camera model update process, computing device 110 can operate camera 130 to capture the at least one additional image such that the additional image(s) can include one or more additional objects that represent respectively one or more additional stars that each have a certain level of brightness that is less than that of other stars captured in previous images using shorter exposure times. In this manner, computing device 110 according to example embodiments described herein can thereby operate camera 130 at one or more iterations (e.g., at each iteration) to capture one or more additional images of one or more additional stars that are each relatively dimmer compared to other stars captured in a previous image using a shorter exposure time at a previous iteration of the iterative camera model update process.

At 312, computer-implemented method 300 can include identifying (e.g., attempting to identify), by the computing device at the one or more iterations of the iterative process, in the additional image, an additional object that corresponds to an additional cataloged star. For example, at one or more iterations (e.g., at each iteration) of the iterative camera model update process, computing device 110 can implement (e.g., execute, run) pattern matching algorithm 122 and/or centroiding algorithm 124 to attempt to identify at least one additional object in the additional image that corresponds respectively to at least one additional cataloged star.

In at least one embodiment, at one or more iterations (e.g., at each iteration) of the iterative camera model update process, computing device 110 can implement (e.g., execute, run) pattern matching algorithm 110 in the same manner as it can when characterizing the above-described initial version of camera model 132. For example, in this or another embodiment, at one or more iterations (e.g., at each iteration) of the iterative camera model update process, computing device 110 can implement pattern matching algorithm 122 to: match (e.g., attempt to match) additional triangles observed between the additional object(s) in the additional image to additional known triangles between the additional cataloged star(s); and identify (e.g., attempt to identify) one or more of the additional object(s) in such additional triangles that correspond respectively to one or more of the additional cataloged star(s) in such additional known triangles.

In some embodiments, computing device 110 can implement pattern matching algorithm 122 using one or more match parameters that define how quickly, efficiently. and/or effectively computing device 110 (e.g., via pattern matching algorithm 122) can identify (e.g., attempt to identify) one or more objects in an image that correspond respectively to one or more cataloged stars. In these or other embodiments, such match parameter(s) can include and/or constitute parameter(s) associated with, for instance: any intrinsic camera parameters already known; the level of brightness of stars in the night sky that are captured in the image(s); the level of brightness and/or focus of the object(s) captured in the image(s); the level of brightness of the cataloged star(s); and/or a defined maximum amount of compute time that can be used with each execution of pattern matching algorithm 122.

In some embodiments, when characterizing the above-described initial version of camera model 132, computing device 110 can implement pattern matching algorithm 122 using one or more match parameters having value(s) that are relatively broad to allow computing device 110 (e.g., via pattern matching algorithm 122) to identify (e.g., attempt to identify) a certain quantity (e.g., 1, 2, 5, 10, 20) of objects in an image that correspond to an equal quantity of the relatively brightest stars in a night sky in a relatively quick, efficient, and/or effective manner. In these or other embodiments, when updating the initial version of camera model 132, at one or more iterations (e.g., at each iteration) of the iterative camera model update process, computing device 110 can adjust one or more values of such match parameters to relatively narrower, more restrictive, and/or more limiting value(s) compared to match parameter value(s) used in previous iterations. In these or other embodiments, computing device 110 can implement pattern matching algorithm 122 using the relatively narrower match parameter value(s) at one or more iterations (e.g., at each iteration) of the iterative camera model update process to attempt to identify one or more additional objects in an additional image that correspond respectively to one or more additional cataloged stars. For example, in at least one embodiment, at each iteration of the iterative camera model update process, computing device 110 can implement pattern matching algorithm 122 using increasingly narrower match parameter value(s) to attempt to match increasingly more and dimmer objects in captured images with increasingly more and dimmer stars in a star catalog.

At 314, computer-implemented method 300 can include updating, by the computing device at the one or more iterations of the iterative process, the camera model based at least in part on additional location data corresponding respectively to the additional object and the additional cataloged star. For example, at one or more iterations (e.g., at each iteration) of the iterative camera model update process, computing device 110 can update the above-described initial version of camera model 132 or the most current updated version of camera model 132 based at least in part on (e.g., using) additional location data corresponding respectively to the additional object and the additional cataloged star.

In some embodiments, at one or more iterations (e.g., at each iteration) of the iterative camera model update process, computing device 110 can update the initial version of camera model 132 or the most current updated version of camera model 132 in the same manner it can define the initial version of camera model 132 as described above. For instance, in at least one embodiment, to update the most current updated version of camera model 132 at one or more iterations (e.g., at each iteration) of the iterative camera model update process, computing device 110 can determine (e.g., using centroiding algorithm 124) the pixel location of each of the additional object(s) and obtain (e.g., using a star catalog) the true world ray of each corresponding additional cataloged star to generate a known pixel→world ray correspondence (known pixel-to-world ray correspondence) for each of the additional object and additional cataloged star matches. In this or another embodiment, computing device 110 can then use the resulting known pixel→world ray correspondences (known pixel-to-world ray correspondences) to define an updated version of camera model 132 at one or more iterations (e.g., at each iteration) of the iterative camera model update process. For example, in this or another embodiment, computing device 110 can use the resulting known pixel→world ray correspondences (known pixel-to-world ray correspondences) to define one or more updated intrinsic camera parameters of camera 130 that can include, for instance, an updated pixel size, an updated field of view, an updated lens distortion, an updated map of the lens distortion, an updated radial distortion term, an updated pixel scale, an updated optical center offset, and/or another updated intrinsic camera parameter.

In some embodiments, computing device 110 can perform (e.g., by repeating operations 308-314) the iterative camera model update process as described above to iteratively update the most current updated version of camera model 132 at one or more iterations (e.g., at each iteration) until computing device 110 (e.g., via pattern matching algorithm 122) fails to identify at least one object in an image that corresponds respectively to at least one cataloged star. In these embodiments, based on such failure to identity at least one object and cataloged star match, the most current version of camera model 132 that was defined at a preceding iteration (e.g., at an immediately preceding iteration) of the iterative camera model update process can constitute a final version of camera model 132. In some embodiments, such a final version of camera model 132 can constitute a relatively high-fidelity camera model (e.g., relative to a camera model computing device 110 could otherwise define without implementing the disclosed technology described herein). In some embodiments, computing device 110 can perform (e.g., by repeating operations 308-314) the iterative camera model update process as described above to iteratively update the most current updated version of camera model 132 at one or more iterations (e.g., at each iteration) until computing device 110 determines that an updated version of camera model 132 (e.g., the most current updated version of camera model 132) has a certain fidelity (e.g., a relatively high-fidelity compared to a camera model the computing device could otherwise define without implementing the disclosed technology described herein).

Figure 4:
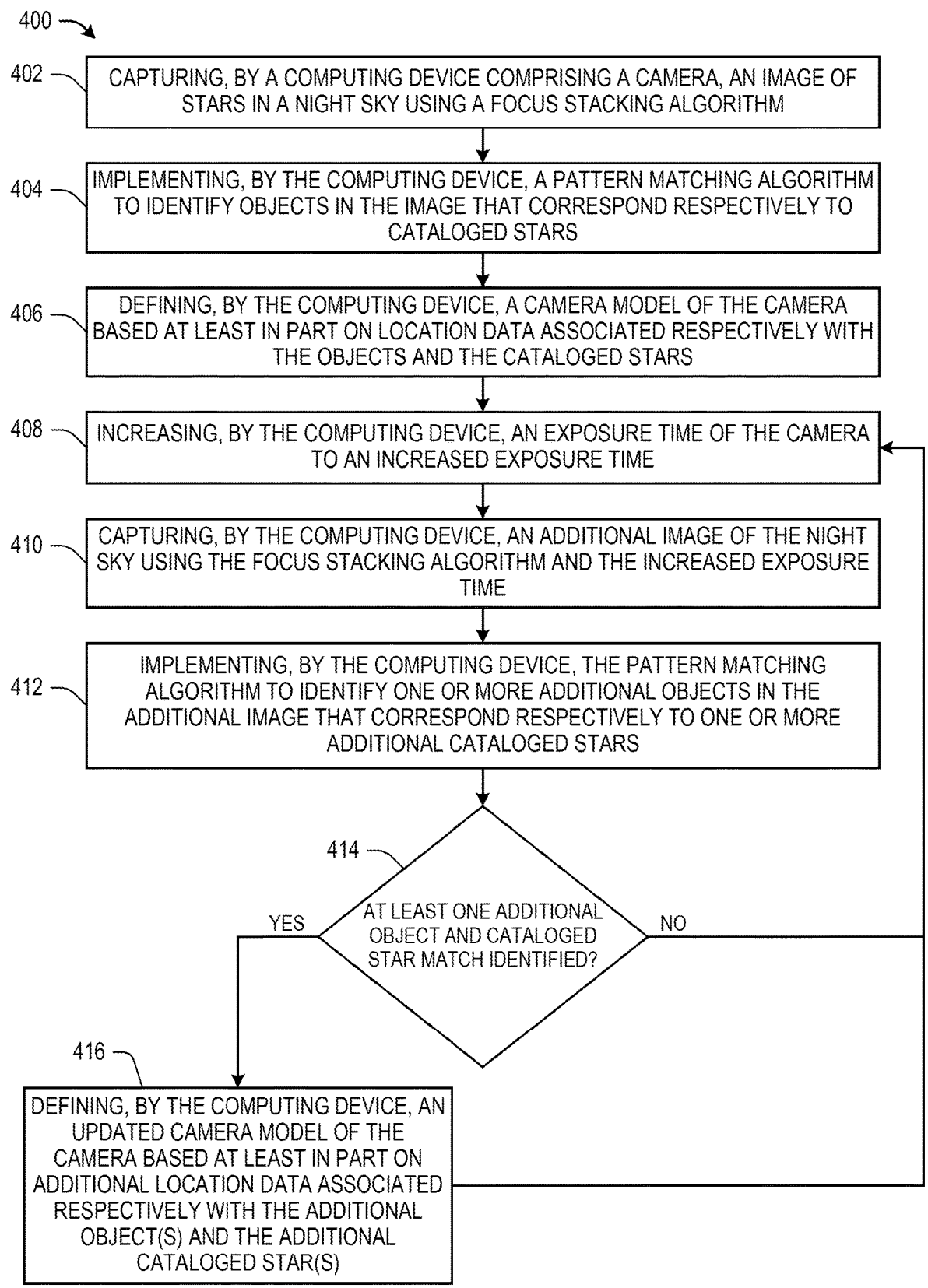

FIG. 4 illustrates a flow diagram of an example, non-limiting computer-implemented method 400 according to one or more example embodiments of the present disclosure. Computer-implemented method 400 can be implemented using, for instance, computing device 110, 230, 240, or 250 described above with reference to the example embodiments depicted in FIGS. 1 and 2.

The example embodiment illustrated in FIG. 4 depicts operations performed in a particular order for purposes of illustration and discussion. Those of ordinary skill in the art, using the disclosures provided herein, will understand that various operations or steps of computer-implemented method 400 or any of the other methods disclosed herein may be adapted, modified, rearranged, performed simultaneously, include operations not illustrated, and/or modified in various ways without deviating from the scope of the present disclosure.

At 402, computer-implemented method 400 can include capturing, by a computing device (e.g., computing device 110) comprising a camera (e.g., camera 130), an image of stars in a night sky using a focus stacking algorithm. For example, computing device 110 can operate camera 130 to capture an image of stars in a night sky using a certain exposure time of camera 130 and focus stacking algorithm 120.

At 404, computer-implemented method 400 can include implementing, by the computing device, a pattern matching algorithm to identify objects in the image that correspond respectively to cataloged stars. For example, computing device 110 can implement (e.g., execute, run) pattern matching algorithm 122 (e.g., a star tracker algorithm, triangle matching algorithm) and/or centroiding algorithm 124 to identify (e.g., attempt to identify) one or more objects in the image that correspond respectively to one or more cataloged stars.

At 406, computer-implemented method 400 can include defining, by the computing device, a camera model (e.g., an initial version of camera model 132) of the camera based at least in part on location data associated respectively with the objects and the cataloged stars. For example, as described in example embodiments of the present disclosure, computing device 110 can define an initial version of camera model 132 using pixel location data corresponding to each of the objects, which can be obtained by centroiding algorithm 124, and using location data of each of the cataloged stars, which can be obtained from a star catalog. In these embodiments, computing device 110 can use such location data to generate a known pixel→world ray correspondence (known pixel-to-world ray correspondence) for each of the object and cataloged star matches. In these embodiments, computing device 110 can then use the resulting known pixel-→world ray correspondences (known pixel-to-world ray correspondences) to define an initial version of camera model 132 (e.g., to define one or more initial intrinsic camera parameters of camera 130).

At 408, computer-implemented method 400 can include increasing, by the computing device, an exposure time of the camera to an increased exposure time. For example, computing device 110 can increase the exposure time of camera 130 that can be used at operation 402 to capture the image of the stars in the night sky. For instance, computing device 110 can increase such an exposure time of camera 130 to an increased exposure time having a duration that is longer compared to that of the exposure time that can be used at operation 402.

At 410, computer-implemented method 400 can include capturing, by the computing device, an additional image of the night sky using the focus stacking algorithm and the increased exposure time. For example, computing device 110 can operate camera 130 to capture an additional image of the night sky using focus stacking algorithm 120 and the increased exposure time.

At 412, computer-implemented method 400 can include implementing, by the computing device, the pattern matching algorithm to identify one or more additional objects in the additional image that correspond respectively to one or more additional cataloged stars. For example, computing device 110 can implement (e.g., execute, run) pattern matching algorithm 122 and/or centroiding algorithm 124 to identify (e.g., attempt to identify) one or more additional objects in the additional image that correspond respectively to one or more additional cataloged stars.

At 414, computer-implemented method 400 can include determining, by the computing device, whether at least one additional object and additional cataloged star match have been identified. For example, computing device 110 can determine whether pattern matching algorithm 122 was able to identify at least one additional object in the additional image that correspond respectively to at least one additional cataloged star (e.g., pattern matching algorithm 122 can notify computing device 110 when it fails to identify at least one additional object and additional cataloged star match).

If it is determined at 414 that at least one additional object and additional cataloged star match have not been identified (e.g., by computing device 110 via pattern matching algorithm 122), the computing device can repeat operations 408, 410, 412, and 414 of computer-implemented method 400. In contrast, if it is determined at 414 that at least one additional object and additional cataloged star match have been identified (e.g., by computing device 110 via pattern matching algorithm 122), the computing device can perform operation 416 of computer-implemented method 400.

At 416, computer-implemented method 400 can include defining, by the computing device, an updated camera model of the camera based at least in part on additional location data associated respectively with the additional object(s) and the additional cataloged star(s). For example, as described in example embodiments of the present disclosure, computing device 110 can define an updated version of camera model 132 using additional pixel location data corresponding to each of the additional object(s), which can be obtained by centroiding algorithm 124, and using additional location data of each of the additional cataloged star(s), which can be obtained from a star catalog. In these embodiments, computing device 110 can use such additional location data to generate a known pixel→world ray correspondence (known pixel-to-world ray correspondence) for each of the additional object and additional cataloged star matches. In these embodiments, computing device 110 can then use the resulting known pixel→world ray correspondences (known pixel-to-world ray correspondences) to define an updated version of camera model 132 (e.g., to define one or more updated intrinsic camera parameters of camera 130). In at least one embodiment, upon defining such an updated version of camera model 132 at 416, computer-implemented method 400 can include repeating, by the computing device, operations 408, 410, 412, and 414.

Although not illustrated in the example embodiment depicted in FIG. 4, in some embodiments, computer-implemented method 400 can include repeating, by the computing device, operations 408, 410, 412, 414, and 416 until the computing device (e.g., computing device 110 via pattern matching algorithm 122) fails to identify at least one additional object in an additional image that corresponds respectively to at least one additional cataloged star. In these embodiments, based on such failure to identity at least one additional object and additional cataloged star match, computer-implemented method 400 can end and the most current version of camera model 132 that was defined at a preceding iteration of operation 416 (e.g., at an immediately preceding iteration of operation 416) can constitute a final version of camera model 132. In some embodiments, such a final version of camera model 132 can constitute a relatively high-fidelity camera model (e.g., relative to a camera model computing device 110 could otherwise define without implementing computer-implemented method 400).

Although not illustrated in the example embodiment depicted in FIG. 4, in some embodiments, computer-implemented method 400 can include repeating, by the computing device, operations 408, 410, 412, 414, and 416 until the computing device (e.g., computing device 110) determines that an updated version of camera model 132 (e.g., the most current updated version of camera model 132 that can be defined at operation 416) has a certain fidelity (e.g., a relatively high-fidelity compared to a camera model computing device 110 could otherwise define without implementing computer-implemented method 400). In these embodiments, based on such a determination that an updated version of camera model 132 has a certain fidelity, computer-implemented method can end and such an updated version of camera model 132 can constitute a final version of camera model 132.

Additional Disclosure

The technology discussed herein makes reference to servers, databases, software applications, and other computer-based systems, as well as actions performed by, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computing device, comprising:
a camera;
one or more processors; and
one or more non-transitory computer-readable media that store instructions that, when executed by the one or more processors, cause the computing device to perform operations, the operations comprising:
defining a camera model of the camera based at least in part on location data associated respectively with an object in an image of a night sky and a cataloged star that corresponds to the object; and
performing an iterative process to iteratively update the camera model, wherein for at least one iteration of the iterative process the operations further comprise:
increasing an exposure time of the camera to an increased exposure time,
operating the camera to capture an additional image of the night sky using the increased exposure time,
identifying, in the additional image, an additional object that corresponds to an additional cataloged star, and
updating the camera model based at least in part on additional location data associated respectively with the additional object in the additional image of the night sky and the additional cataloged star that corresponds to the additional object.

2. The computing device of claim 1, wherein the operations further comprise:
determining the exposure time of the camera that allows the computing device to identify, in the image, the object that corresponds to the cataloged star, the image being captured by the camera using the exposure time.

3. The computing device of claim 1, wherein the operations further comprise:
implementing a focus stacking algorithm to capture at least one of the image or the additional image using the camera such that at least one of the object or the additional object has a defined focus.

4. The computing device of claim 1, wherein the operations further comprise:
implementing a pattern matching algorithm to identify, in the image, the object that corresponds to the cataloged star; and
implementing the pattern matching algorithm to identify, in the additional image, the additional object that corresponds to the additional cataloged star.

5. The computing device of claim 1, wherein the operations further comprise:

implementing a pattern matching algorithm that is set to one or more first match parameters to identify, in the image, the object that corresponds to the cataloged star;

adjusting the one or more first match parameters to one or more second match parameters that are narrower than the one or more first match parameters; and implementing the pattern matching algorithm using the one or more second match parameters to identify, in the additional image, the additional object that corresponds to the additional cataloged star.

6. The computing device of claim 1, wherein the computing device comprises at least one of a client computing device, a computer, a laptop, a cellular phone, a smartphone, a tablet, a wearable computing device, an action camera, a dashboard camera, or an omnidirectional camera.

7. The computing device of claim 1, wherein the camera model is indicative of one or more intrinsic camera parameters of the camera, the one or more intrinsic camera parameters comprising at least one of a field of view, a lens distortion, a map of the lens distortion, a radial distortion term, a pixel scale, or an optical center offset.

8. The computing device of claim 1, wherein performing the iterative process to iteratively update the camera model comprises:

performing the iterative process to iteratively identify, in one or more additional images, one or more additional objects that correspond respectively to one or more additional cataloged stars that each have a defined brightness that is dimmer than a brightness of the cataloged star and previous cataloged stars identified in previous iterations of the iterative process as corresponding respectively to previous objects in one or more previous images.

9. The computing device of claim 1, wherein performing the iterative process to iteratively update the camera model comprises:

performing the iterative process to iteratively update the camera model to obtain a final camera model having a defined fidelity.

10. A computer-implemented method of characterizing an undefined camera model of a computing device camera, the computer-implemented method comprising:

defining, by a computing device comprising a camera, a camera model of the camera based at least in part on location data associated respectively with an object in an image of a night sky and a cataloged star that corresponds to the object; and performing, by the computing device, an iterative process to iteratively update the camera model, wherein for at least one iteration of the iterative process the computer-implemented method further comprises:

increasing an exposure time of the camera to an increased exposure time, operating the camera to capture an additional image of the night sky using the increased exposure time, identifying, in the additional image, an additional object that corresponds to an additional cataloged star, and updating, by the computing device, the camera model based at least in part on additional location data associated respectively with the additional object in the additional image of the night sky and the additional cataloged star that corresponds to the additional object.

11. The computer-implemented method of claim 10, further comprising:

determining, by the computing device, the exposure time of the camera that allows the computing device to identify, in the image, the object that corresponds to the cataloged star, the image being captured by the camera using the exposure time.

12. The computer-implemented method of claim 10, further comprising:

implementing, by the computing device, a focus stacking algorithm to capture at least one of the image or the additional image using the camera such that at least one of the object or the additional object has a defined focus.

13. The computer-implemented method of claim 10, further comprising:

implementing, by the computing device, a pattern matching algorithm to identify, in the image, the object that corresponds to the cataloged star; and implementing, by the computing device, the pattern matching algorithm to identify, in the additional image, the additional object that corresponds to the additional cataloged star.

14. The computer-implemented method of claim 10, further comprising:

implementing, by the computing device, a pattern matching algorithm that is set to one or more first match parameters to identify, in the image, the object that corresponds to the cataloged star;

adjusting, by the computing device, the one or more first match parameters to one or more second match parameters that are narrower than the one or more first match parameters; and implementing, by the computing device, the pattern matching algorithm using the one or more second match parameters to identify, in the additional image, the additional object that corresponds to the additional cataloged star.

15. The computer-implemented method of claim 10, wherein the computing device comprises at least one of a client computing device, a computer, a laptop, a cellular phone, a smartphone, a tablet, a wearable computing device, an action camera, a dashboard camera, or an omnidirectional camera.

16. The computer-implemented method of claim 10, wherein the camera model is indicative of one or more intrinsic camera parameters of the camera, the one or more intrinsic camera parameters comprising at least one of a field of view, a lens distortion, a map of the lens distortion, a radial distortion term, a pixel scale, or an optical center offset.

17. The computer-implemented method of claim 10, wherein performing, by the computing device, the iterative process to iteratively update the camera model comprises:

performing, by the computing device, the iterative process to iteratively identify, in one or more additional images, one or more additional objects that correspond respectively to one or more additional cataloged stars that each have a defined brightness that is dimmer than a brightness of the cataloged star, the additional cataloged star, and previous cataloged stars identified in previous iterations of the iterative process as corresponding respectively to previous objects in one or more previous images.

18. One or more non-transitory computer-readable media that store instructions that, when executed by one or more processors of a computing device, cause the computing device to perform operations, the computing device being operatively coupled to a camera and the operations comprising:
- defining a camera model of the camera based at least in part on location data associated respectively with an object in an image of a night sky and a cataloged star that corresponds to the object; and
- performing an iterative process to iteratively update the camera model, wherein for at least one iteration of the iterative process the operations further comprise:
  - increasing an exposure time of the camera to an increased exposure time,
  - operating the camera to capture an additional image of the night sky using the increased exposure time,
  - identifying, in the additional image, an additional object that corresponds to an additional cataloged star, and
  - updating the camera model based at least in part on additional location data associated respectively with the additional object in the additional image of the night sky and the additional cataloged star that corresponds to the additional object.

* * * * *